(12) United States Patent
Michishita et al.

(10) Patent No.: US 8,246,510 B2
(45) Date of Patent: Aug. 21, 2012

(54) VEHICLE DRIVE FORCE CONTROL APPARATUS

(75) Inventors: Masaya Michishita, Toyota (JP); Michiaki Nakao, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 840 days.

(21) Appl. No.: 12/310,203

(22) PCT Filed: May 11, 2007

(86) PCT No.: PCT/JP2007/059783
§ 371 (c)(1),
(2), (4) Date: Feb. 17, 2009

(87) PCT Pub. No.: WO2008/032469
PCT Pub. Date: Mar. 20, 2008

(65) Prior Publication Data
US 2009/0280950 A1 Nov. 12, 2009

(30) Foreign Application Priority Data
Sep. 12, 2006 (JP) .................................. 2006-246729

(51) Int. Cl.
*H02P 15/00* (2006.01)
(52) U.S. Cl. ............................................. 477/8; 477/20
(58) Field of Classification Search .................. 477/3, 5, 477/7, 8, 15, 17, 20, 37, 44, 110, 115, 173, 477/174, 176, 180; 180/65.1, 65.21, 65.265, 180/65.31, 337, 656; 903/902
See application file for complete search history.

(56) References Cited

U.S. PATENT DOCUMENTS

| 6,319,168 | B1 | 11/2001 | Morris et al. |
| 6,484,832 | B1 | 11/2002 | Morisawa et al. |
| 7,044,255 | B2 | 5/2006 | Maeda et al. |
| 2002/0058565 | A1 | 5/2002 | Yamamoto et al. |
| 2003/0162631 | A1 | 8/2003 | Williams |

FOREIGN PATENT DOCUMENTS

| EP | 1 236 603 A2 | 9/2002 |
| JP | A-63-203430 | 8/1988 |
| JP | A-2001-65382 | 3/2001 |

(Continued)

OTHER PUBLICATIONS

Imura et al., "Hill Climbing Performance of Batteryless Motorized-Four-Wheel-Drive System," May 20, 2005, pp. 5-10.

(Continued)

*Primary Examiner* — Justin Holmes
(74) *Attorney, Agent, or Firm* — Oliff & Berridge, PLC

(57) ABSTRACT

A vehicle drive force control apparatus for controlling a drive force of a vehicle including: a main drive power source for driving main drive wheels through a coupling device and a transmission, an electric generator operated by a drive force generated by the main drive power source, and an electric motor which is driven by electric power generated by the electric generator, to generate a drive torque that can be transmitted to auxiliary drive wheels. The vehicle drive force control apparatus controls the coupling device and transmission to reduce an engaging force of the coupling device and shift up the transmission during driving of the auxiliary drive wheels, so that the operating speed of the main drive power source is raised according to a load of the coupling device, while the electric power generated by the electric generator is increased, permitting an increase of the drive torque of the auxiliary drive wheels and stable 4-wheel-drive control.

10 Claims, 15 Drawing Sheets

FOREIGN PATENT DOCUMENTS

| | | |
|---|---|---|
| JP | A-2001-333507 | 11/2001 |
| JP | A-2002-147600 | 5/2002 |
| JP | A-2002-295659 | 10/2002 |
| JP | A-2004-19875 | 1/2004 |
| JP | A-2004-218487 | 8/2004 |
| JP | B2-3552710 | 8/2004 |
| JP | A-2005-127235 | 5/2005 |
| JP | A-2005-147056 | 6/2005 |

OTHER PUBLICATIONS

"Toyota THS-11 Parallel/Series Hybrid System," Jun. 12, 2006, pp. [3-1]-[3-55].

European Search Report issued in European Patent Application No. EP 07 74 3218.5 dated Feb. 22, 2011.

VEHICLE DRIVE FORCE CONTROL APPARATUS

TECHNICAL FIELD

The present invention relates to a vehicle drive force control apparatus for controlling a drive force of a vehicle which includes a main drive power source for driving a main drive wheel through a coupling device and a transmission, an electric generator operated by a drive force generated by the main drive power source, and an electric motor which is driven by electric power generated by the electric generator, to generate a drive torque that can be transmitted to an auxiliary drive wheel.

BACKGROUND ART

There is known a vehicle which includes a main drive power source for driving a main drive wheel through a coupling device and a transmission, an electric generator operated by a drive force generated by the main drive power source, and an electric motor which is driven by electric power generated by the electric generator, to generate a drive torque that can be transmitted to an auxiliary drive wheel. Patent Document 1 discloses an example of such a vehicle.

In this type of vehicle, the electric generator is operated by the drive force generated by the main drive power source provided to drive the main drive wheels, and the electric motor is operated by the electric power generated by the electric generator, to generate the drive torque to be transmitted to the auxiliary drive wheels. This type of vehicle is advantageous in that the vehicle need not be provided with a battery, for driving the auxiliary drive wheels.

Where the vehicle is not provided with the battery, the electric power to be supplied to the electric motor is limited to the electric power concurrently generated by the electric generator driven by the drive force of the main drive power source. The amount of electric power that is generated by the electric generator depends upon the operating speed of the main drive power source used to drive the electric generator. Accordingly, a drop of the operating speed of the main drive power source causes a drop of the amount of electric power generated by the electric generator, which may cause a failure of the electric generator to generate the drive force required to drive the auxiliary drive wheels. In order to prevent insufficiency or failure of generation of the electric power by the electric generator, Patent Document 1 discloses a solution by inhibiting a change of a shifting map to thereby preventing a shift-up action of the transmission, for holding the operating speed of the main drive power source at an adequate value.

To prevent the above-indicated insufficiency or failure of generation of the electric power by the electric generator, Patent Document 2 discloses a technique of increasing an upper limit of a permissible slip ratio of the main drive wheels during starting or acceleration of the vehicle at a running speed of zero or at an extremely low running speed close to substantially zero, so that the main drive wheels are positively slipped, to increase the amount of electric power generated by the electric generator.

Patent Document 1: JP-3552710 B
Patent Document 2: JP-2007-147056 A

DISCLOSURE OF THE INVENTION

Object Achieved by the Invention

However, holding the speed ratio of the transmission at the highest value results in minimizing an output load of the fluid coupling device disposed between the main drive power source and the transmission, so that the fluid coupling device cannot be positively slipped. That is, the operating speed of the main drive power source depends solely on the rotating speed of the main drive wheels and the speed ratio of the transmission, without taking account of the slipping of the fluid coupling device. Therefore, there is a problem that during running of the vehicle at a low speed, the operating speed of the engine cannot be high enough to drive the electric generator for sufficient generation of the electric power except while the main drive wheels are in a slipping state, for example.

Further, the positive slipping of the main drive wheels may cause lateral slipping of the vehicle during starting of the vehicle on an uphill roadway, for example, giving rise to a risk of control failure of the vehicle. This risk is high particularly where the main drive wheels are front wheels.

The present invention was made in view of the background art described above. It is an object of this invention to enable the electric generator to generate a desired output even when the vehicle is running at a low speed.

Means for Achieving the Object

The object indicated above may be achieved according to the present invention, which provides a vehicle drive force control apparatus for controlling a drive force of a vehicle which includes a main drive power source for driving main drive wheels through a coupling device and a transmission, an electric generator operated by a drive force generated by the main drive power source, and an electric motor which is driven by electric power generated by the electric generator, to generate a drive torque that can be transmitted to auxiliary drive wheels, the vehicle drive force control apparatus being characterized by controlling the coupling device and the transmission to reduce an engaging force of the coupling device and shift up the transmission during driving of the auxiliary drive wheels.

Advantages of the Invention

The present vehicle drive force control apparatus is arranged such that the engaging force of the coupling device is reduced during driving of the auxiliary drive wheels, so that the operating speed of the main drive power source rises according to a load of the coupling device, while at the same time the transmission is shifted up, whereby the slipping of the main drive wheels can be reduced. Further, the rise of the operating speed of the main drive power source causes an increase of the amount of electric power generated by the electric generator, permitting an increase of the drive torque of the auxiliary drive wheels and a stable 4-wheel-drive control of the vehicle.

Preferably, the coupling device is a torque converter provided with a lock-up mechanism, and the lock-up mechanism is released to reduce the engaging force during driving of the auxiliary drive wheels. In this case, the lock-up mechanism provided in the torque converter is released during driving of the auxiliary drive wheels, so that the load acting on the torque converter is given to the main drive power source to cause a rise of its operating speed.

Preferably, the vehicle drive force control apparatus comprises shifting-map changing means for changing a shift-up map for shifting up the transmission, during starting of the vehicle, such that the changed shift-up map causes a shift-up action of the transmission at a lower speed. In this case, the transmission is shifted up to a higher-gear position, at a lower operating speed of the main drive power source, during starting of the vehicle during which the drive wheels tend to easily slip. The shift-up action of the transmission positively causes an increase of the amount of slipping of the coupling device, for thereby assuring increased stability of starting of the vehicle.

Preferably, reduction of the engaging force of the coupling device and a shift-up action of the transmission take place during starting of the vehicle. In this case, the electric generator can generate a sufficient amount of electric power for driving the auxiliary drive wheels to provide an assisting vehicle drive force for assuring increased stability of starting of the vehicle. In the absence of the assisting vehicle drive force, the main drive wheels would tend to easily slip during starting of the vehicle.

Preferably, the vehicle drive force control apparatus is configured such that the transmission is forcibly shifted up during starting of the vehicle. In this case, the output load of the coupling device is increased, and the amount of slipping of the coupling device is positively increased, during starting of the during which the transmission is compelled to be shifted up. Accordingly, the operating speed of the main drive power source is raised, so that the amount of electric power generated by the electric generator can be increased, assuring high stability of starting of the vehicle during which the drive wheels would tend to slip.

Preferably, reduction of the engaging force of the coupling device and a shift-up action of the transmission are effected while the vehicle is stationary. In this case, the desired amount of electric power is generated by the electric generator during starting of the vehicle, owing to the shift up action of the transmission effected while the vehicle is stationary. This arrangement assures high stability of the vehicle starting during which the drive wheels would tend to easily slip.

Preferably, the vehicle drive force control apparatus comprises (a) auxiliary-drive-wheel drive-force calculating means for calculating a required drive force of the auxiliary drive wheels, (b) judging means for determining whether an amount of electric power generated by the electric generator is sufficient to provide the required drive force of the auxiliary drive wheels, and (c) control commanding means for reducing the engaging force of the coupling device and shifting up the transmission when the judging means determines that the amount of electric power generated by the electric generator is not sufficient to provide the required drive force of the auxiliary drive wheels. In this case, the required drive force of the auxiliary drive wheels is calculated by the auxiliary-drive-wheel drive-force calculating means, and the judging means determines whether the amount of electric power generated by the electric generator is sufficient to provide the required amount of electric power for obtaining the calculated required drive force of the auxiliary drive wheels. When the judging means determines that the required amount of electric power for obtaining the required drive force of the auxiliary drive wheel is not obtained, the control commanding means is operated to reduce the engaging force of the coupling device, and shift up the transmission. This arrangement prevents unnecessary reduction of the engaging force of the coupling device, and an unnecessary shift-up action of the transmission.

Preferably, the vehicle drive force control apparatus comprises control commanding means for reducing the engaging force of the coupling device and shifting up the transmission, in response to a manual operation by an operator of the vehicle. In this case, the engaging force of the coupling device is reduced, and the transmission is shifted up, in response to the manual operation of the vehicle operator. This arrangement prevents unnecessary reduction of the engaging force of the coupling device and an unnecessary shift-up action of the transmission.

Preferably, the vehicle drive force control apparatus comprises (a) auxiliary-drive-wheel drive-force calculating means for calculating a drive force required to drive the auxiliary drive wheels, (b) target generator-drive-torque calculating means for calculating a target drive torque of the electric generator required to provide a target output of the electric generator required to provide the drive force of the auxiliary drive wheels calculated by the auxiliary-drive-wheel drive-force calculating means, (c) speed-ratio-reduction feasibility determining means for determining, on the basis of a condition of the vehicle, whether reduction of a speed ratio $\gamma$ of the automatic transmission from a present value is feasible, and (d) control commanding means for reducing the engaging force of the coupling device and shifting up the transmission, to obtain the target drive torque of the electric generator, when the speed-ratio-reduction feasibility determining means has determined that the reduction of the speed ratio $\gamma$ of the automatic transmission from the present value is feasible. In this case, the required drive force of the auxiliary drive wheels is calculated by the auxiliary-drive-wheel drive-force calculating means, and the target drive torque of the electric generator required to provide the target output of the electric generator required to provide the drive force of the auxiliary drive wheels is calculated by the target generator-drive-torque calculating means. When the speed-ratio-reduction feasibility determining means has determined, on the basis of a condition of the vehicle, that the reduction of the speed ratio $\gamma$ of the automatic transmission from the present value is feasible, and when the amount of electric power is not sufficient to provide the required drive force of the auxiliary drive wheels, the control commanding means reduces the engaging force of the coupling device and shifts up the transmission. This arrangement prevents unnecessary reduction of the engaging force of the coupling device, and an unnecessary shift-up action of the transmission.

Preferably, the vehicle drive force control apparatus comprises (a) auxiliary-drive-wheel drive-force calculating means for calculating a required drive force of the auxiliary drive wheels, (b) target-speed-ratio calculating means for calculating a target speed ratio of the transmission for obtaining a drive torque of the electric generator required to generate a required amount of electric power for obtaining the required drive force of the auxiliary drive wheels, (c) coupling-device releasing requirement determining means for determining the coupling device is required to be released to cause slipping of the coupling device, for obtaining the target speed ratio, and (d) control commanding means operated, when the coupling-device releasing requirement determining means determines that the coupling device is required to be released to cause slipping of the coupling device, for reducing the engaging force of the coupling device and shifting up the transmission. In this case, the control commanding means is operated when the coupling-device releasing requirement determining means determines that the coupling device is required to be released to cause slipping of the coupling device for obtaining the target speed ratio of the transmission to enable the target drive torque of the electric generator to generate the electric power required to obtain the required drive force of the auxiliary drive wheels calculated by the auxiliary-drive-wheel drive-force calculating means, after the target speed ratio of the transmission is calculated by the target-speed-ratio calculating means, so that the engaging force of the coupling device is reduced, and the transmission is shifted up, if the amount of electric power generated by the electric generator is not sufficient to provide the required drive force of the auxiliary drive wheels. This arrangement prevents unnecessary reduction of the engaging force of the coupling device and an unnecessary shift-up action of the transmission.

NOMENCLATURE OF ELEMENTS

Figure 1:
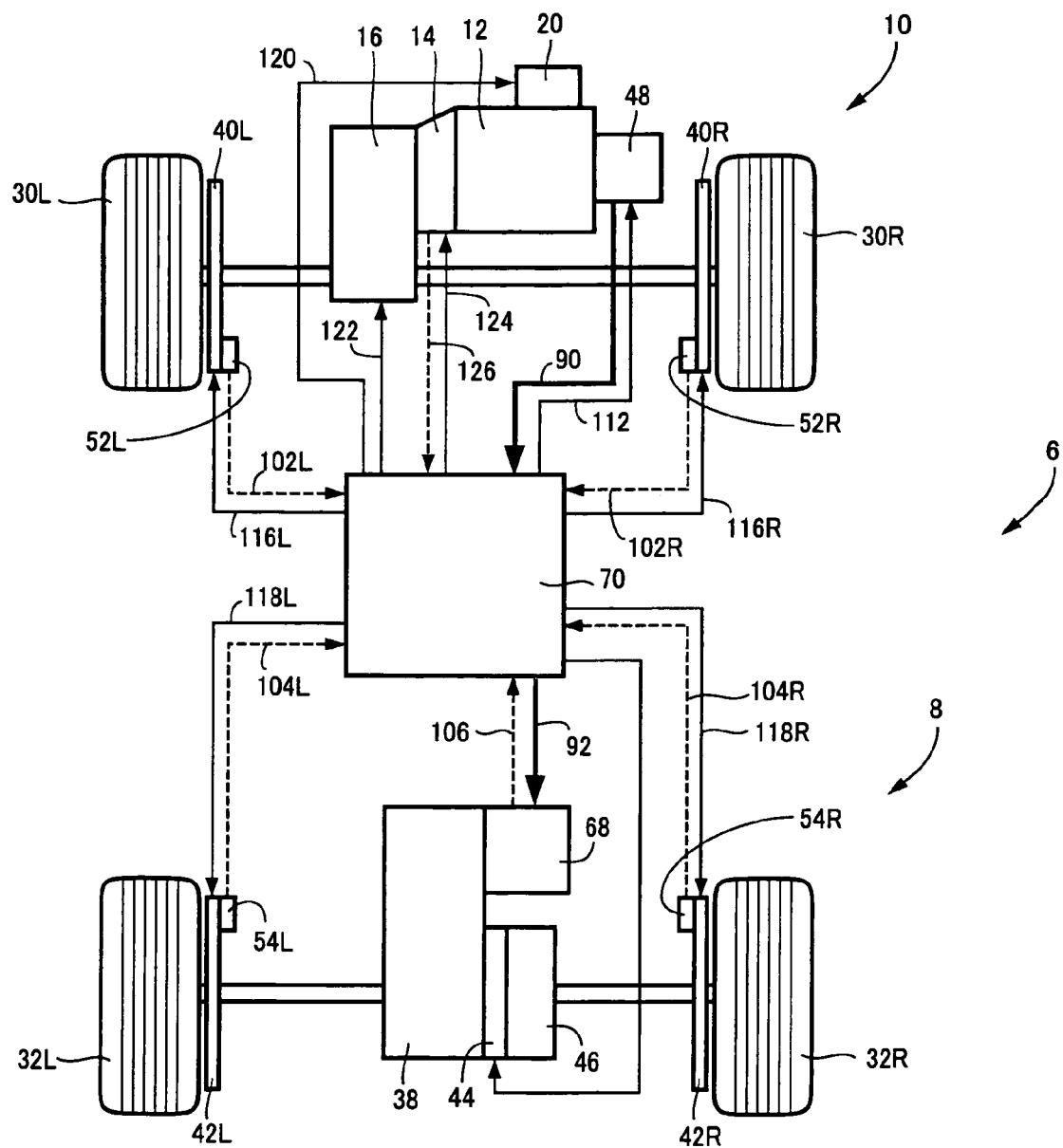
FIG. 1 is a schematic view of a vehicular drive system 6 to which the present invention is applied.

12: Main drive power source
14: Torque converter (Coupling device)
16: Transmission
30: Main drive wheels
32: Auxiliary drive wheels
48: Electric generator
68: Electric motor
70: Drive force control apparatus (Electronic control device)
132: Auxiliary-drive-wheel drive-force calculating means
136: Judging means
138: Control commanding means
154: Shifting-map changing means

BEST MODE FOR CARRYING OUT THE INVENTION

Referring to the drawings, there will be described in detail the preferred embodiments of the present invention.

First Embodiment

Referring to FIG. 1, there is shown an arrangement of a vehicular drive system 6 to which the present invention is applied. This vehicular drive system 6 includes, as major elements thereof, a front-wheel drive device 10 for driving main drive wheels in the form of front wheels 30L, 30R (hereinafter collectively referred to as "front wheels 30"), a rear-wheel drive device 8 for driving auxiliary drive wheels in the form of rear wheels 32L, 32R (hereinafter collectively referred to as "rear wheels 32"), and an electronic control device 70 for controlling these drive devices.

The rear-wheel drive device 8 is provided with an electric motor 68 operated with electric power. An output of the electric motor 68 is transmitted to a differential gear device 46 through a speed reduction gear device 38 and a clutch 44, and is distributed to the left and right auxiliary drive wheels 32. The electric motor 68 is a dc motor, for instance, and is supplied with the electric power generated by an electric generator 48 described below, and operated with the supplied electric power. The clutch 44 described above is disposed between the speed reduction gear device 38 and the differential gear device 46, and is selectively engaged or released to selectively connect and disconnect the speed reduction gear device 38 and the differential gear device 46 to or from each other. While the electric motor 68 is held at rest, for example, the clutch 44 is released to disconnect the speed reduction gear device 38 and the differential gear device 46 from each other, for preventing rotation of the rear wheels 32, which would cause dragging of the electric motor 68 and cause deterioration of fuel economy of the vehicle, or wearing of rectifier and other components of the electric motor 68 where the electric motor 68 is a dc motor. Thus, the clutch 44 placed in the released state while the electric motor 68 is at rest improves durability of the electric motor 68.

The drive wheels 30L, 30R, 32L, 32R are provided with respective speed sensors 52L, 52R, 54L, 54R, the outputs of which relate to a running speed of the vehicle and are transmitted to the electronic control device 70 indicated above. The drive wheels 30L, 30R, 32L, 32R are also provided with respective brakes 40L, 40R, 42L, 42R which are actuated to decelerate the corresponding drive wheels according to commands received from the electronic control device 70.

Figure 2:
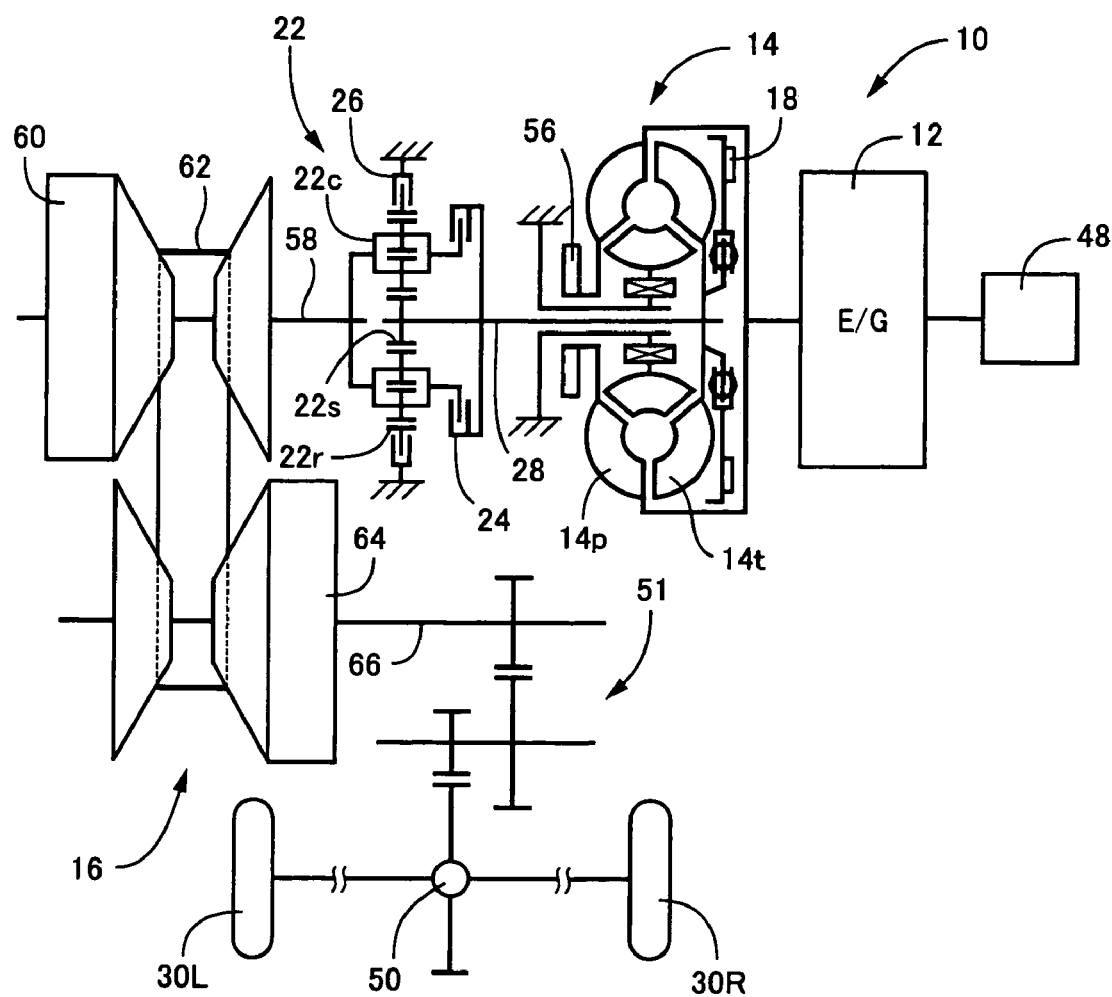
FIG. 2 is a schematic view of a front-wheel drive device 10 to which the present invention is applied.

Referring to the schematic view of FIG. 2, the front-wheel drive device 10 is suitably used for the vehicle which is of a transverse FF (front-engine front-drive) type. The front wheel drive device 10 includes a drive power source in the form of an engine 12 which is an internal combustion engine. An output of the engine 12 is transmitted to a differential gear device 50 through a fluid-operated power transmitting device in the form of a torque converter 14, a forward/reverse switching device 22, a belt-type continuously variable transmission (CVT) 16 and a speed reduction gear device 51, and is distributed to the left and right main drive wheels 30. The output of the engine 12 is also transmitted to the electric generator 48, which has an input shaft connected to an output shaft of the engine 12. The electric generator 48 is operated by the output of the engine to generate electric power.

The torque converter 14 includes a pump impeller 14$p$ connected to an crankshaft of the engine 12, and a turbine impeller 14$t$ connected through a turbine shaft 28 to the forward/reverse switching device 22. The torque converter 14 is configured to transmit a torque through a fluid. Between those pump impeller 14$p$ and turbine impeller 14$t$, there is disposed a lock-up clutch 18 which has an engaging fluid chamber and a releasing fluid chamber. Fluid flows to and from the engaging and releasing fluid chambers are controlled by a lock-up-clutch control device 88 (shown in FIG. 3), to selectively engage and release the lock-up clutch 18. When the lock-up clutch 18 is placed in its fully engaged state, the pump and turbine impellers 14$p$, 14$t$ are rotated as a unit. The pump impeller 14$p$ is provided with a mechanical oil pump 56, which is provided to generate a hydraulic pressure for controlling a shifting action and a belt tension of the continuously variable transmission 16, and lubricating various parts of the continuously variable transmission 16.

The forward/reverse switching device 22 is constituted by a planetary gear set of a double-pinion type, and includes a sun gear 22$s$ connected to the turbine shaft 28 of the torque converter 14, and a carrier 22$c$ connected to an input shaft 58 of the continuously variable transmission 16. When a forward-drive clutch 24 disposed between the carrier 22$c$ and the sun gear 22$s$ is engaged, the forward/reverse switching device 22 is rotated as a unit so that the turbine shaft 28 is connected directly to the input shaft 58, whereby a forward drive force is transmitted to the main drive wheels 30. When a reverse-drive clutch 26 disposed between a ring gear 22$r$ and a housing of the forward/reverse switching device 22 is engaged while the forward-drive clutch 24 is released, the input shaft 58 is rotated in a direction opposite to the direction of rotation of the turbine shaft 28, so that a reverse drive force is transmitted to the main drive wheels 30.

The continuously variable transmission 16 includes a variable-diameter input pulley 60 mounted on the input shaft 28 and having a variable effective diameter, a variable-diameter output pulley 64 mounted on an output shaft 66 and having a variable effective diameter, and a transmission belt 62 connecting these variable-diameter pulleys 60, 64. A torque is transmitted through a force of friction between the variable-diameter pulleys 60, 64 and the transmission belt 62. The variable-diameter pulleys 60, 64 have respective V-grooves the widths of which are variable, and are provided with respective hydraulic cylinders. The widths of the V-grooves of the variable-diameter pulleys 60, 64 is changed to change the effective diameters of the pulleys 60, 64 in contact with the transmission belt 62, by controlling the fluid pressure of the hydraulic cylinder of the variable-diameter input pulley 60 under the control of a shift control device 86 (shown in FIG. 3). Thus, a speed ratio $\gamma$ (=input shaft speed NIN/output shaft speed NOUT) of the continuously variable transmission 16 is continuously variable.

Figure 3:
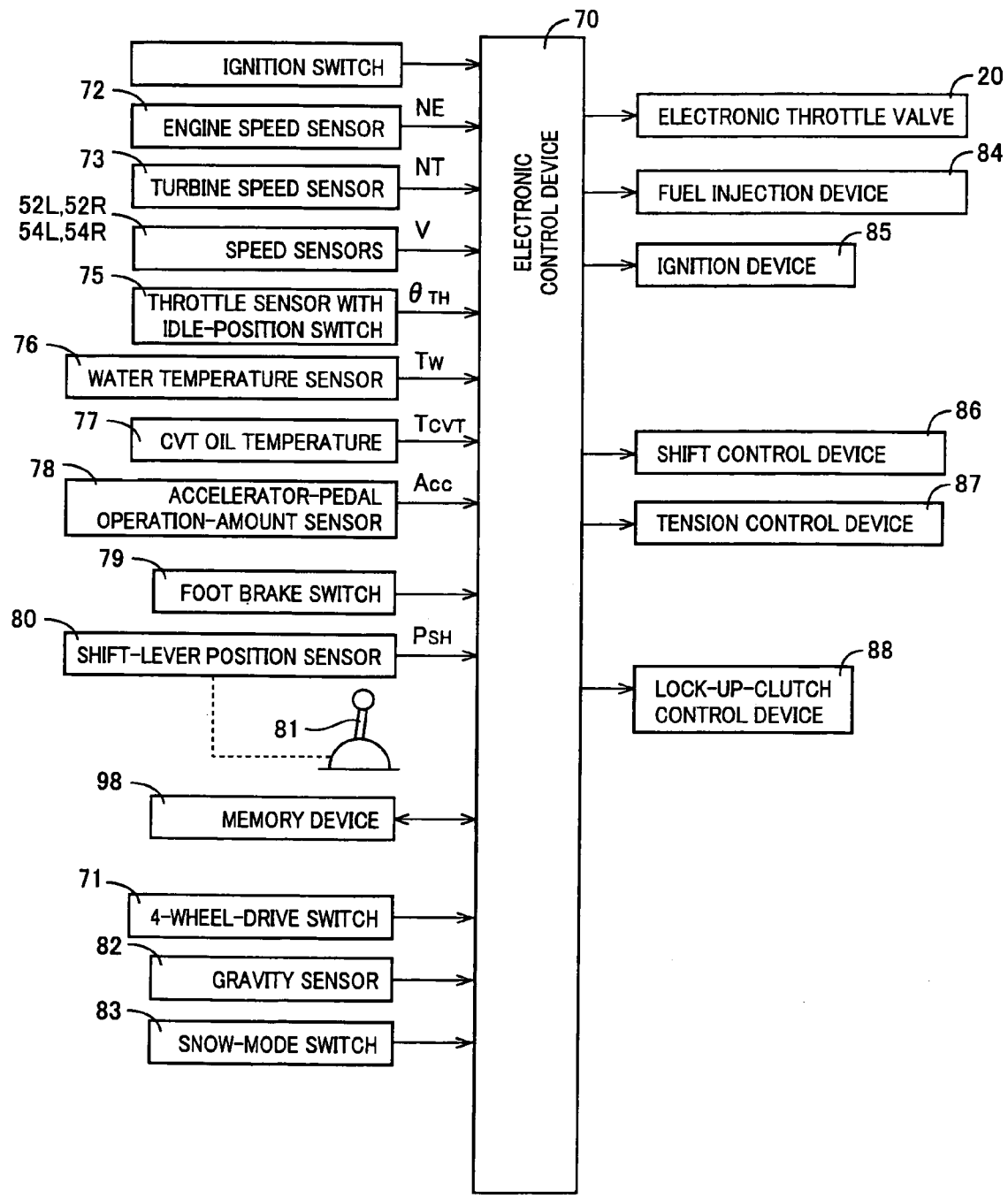
FIG. 3 is a block diagram showing various devices connected to an electronic control device shown in FIG. 1, which is constructed according to one embodiment of this invention.
Figure 4:
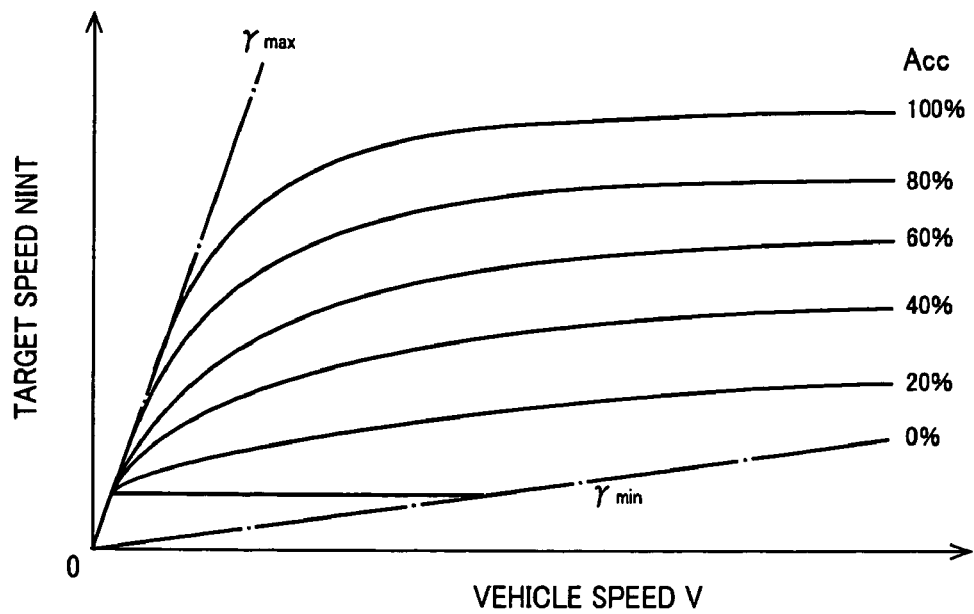
FIG. 4 is a view indicating an example of a shifting map used by a shift control device 86 shown in FIG. 3, to obtain a target speed NINT for controlling a shifting action of a continuously variable transmission 16.

Described in detail, a target value NINT of the input shaft speed NIN is calculated according to a shifting map indicated in FIG. 4 by way of example. The shifting map represents a relationship between the target input shaft speed NINT, and a vehicle running speed V and an operator's required vehicle output in the form of an operation amount Acc of an accelerator pedal. The shifting action of the continuously variable transmission 16 is controlled according to a difference between the actual input shaft speed NIN and the calculated target value NINT, so that the actual input shaft speed NIN coincides with the target value NINT. Described more specifically, the above-described shift control device 86 has solenoid valves which are feed-back controlled to control the fluid flows to and from the hydraulic cylinder of the variable-diameter input pulley 60. The shifting map indicated in FIG. 4 is considered to be a required shifting condition used to change the speed ratio $\gamma$. The shifting map is formulated to determine the target input shaft speed NINT such that the speed ratio $\gamma$ increases with a decrease of the vehicle speed V and an increase of the accelerator pedal operation amount Acc. Since the vehicle speed V corresponds to the output shaft speed NOUT, the target value NINT of the input shaft speed NIN corresponds to a target value of the speed ratio $\gamma$, which is variable within a range between a minimum value $\gamma$min and a maximum value $\gamma$max of the continuously variable transmission 16. The shifting map indicated above is stored in a memory device 98 (shown in FIG. 3).

Referring back to FIG. 2, the fluid pressure of the hydraulic cylinder of the output pulley 64 is regulated under the control of a tension control device 87 (shown in FIG. 3), so as to prevent slipping of the transmission belt 62. The tension control device 87 is provided with a linear solenoid valve the duty ratio or cycle of which is controlled by the electronic control device 70, to continuously change the fluid pressure of the hydraulic cylinder of the variable-diameter output pulley 64, for increasing and reducing the tension of the transmission belt 62, that is, a force of friction between the variable-diameter pulleys 60, 64 and the transmission belt 62.

Figure 5:
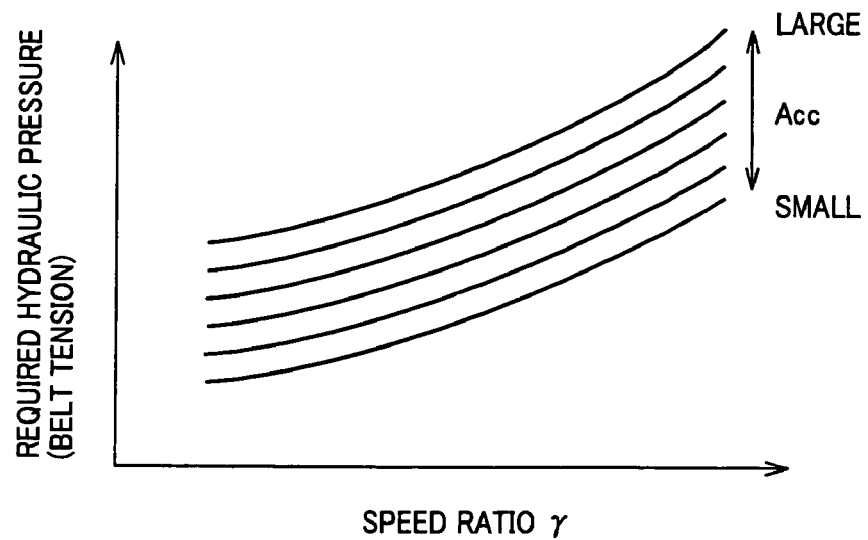
FIG. 5 is a view indicating an example of a hydraulic pressure control map used by a tension control device 87 shown in FIG. 3, to control a required hydraulic pressure of the continuously variable transmission 16 for controlling a tension of a belt of the transmission.

Described in detail, the belt tension of the continuously variable transmission 16 is controlled so as to prevent the belt slipping, according to a predetermined map indicated in FIG. 5 by way of example, which represents a relationship between a required hydraulic pressure (corresponding to the belt tension), and the accelerator pedal operation amount Acc (corresponding to the transmitted torque) and the speed ratio $\gamma$. Described more specifically, the tension control device 87 has a linear solenoid valve an excitation current of which is controlled to regulate the fluid pressure of the hydraulic cylinder of the variable-diameter output pulley 64 which corresponds to the belt tension of the continuously variable transmission 16. Like the shifting map, the map of the required fluid pressure indicated in FIG. 5 is stored in the memory device 98.

Referring back to FIG. 2, the above-indicated electric generator 48 such as an alternator is mounted on the output shaft of the engine 12, such that an input shaft of the electric generator 48 is rotated by a rotary motion of the engine 12, to generate electric power.

Referring to the block diagram of FIG. 3, there is shown a control system provided for the vehicle to control the engine 12 and continuously variable transmission 16 which are shown in FIGS. 1 and 2. To the electronic control device 70, there are connected an engine speed sensor 72, a turbine speed sensor 73, a vehicle speed sensor 74, a throttle sensor 75 provided with an idle-position switch, a water temperature sensor 76, a CVT oil temperature sensor 77, an accelerator-pedal operation-amount sensor 78, a foot brake switch 79 and a shift-lever position sensor 80, so that the electronic control device 70 receives signals respectively indicative of an operating speed NE of the engine 12 (engine speed NE), a rotating speed NT of the turbine shaft 28 (turbine speed NT), the above-indicated vehicle speed V, an angle of opening $\theta$TH of an electronic throttle valve 20 (throttle valve opening angle $\theta$TH) together with its fully closed state (idling state), a water temperature TW of the engine 12, a temperature TCVT of an oil in hydraulic circuits such as those of the continuously variable transmission 16, the above-indicated accelerator-pedal operation amount Acc (accelerator operation amount Acc), absence or presence of an operation of a normal braking system in the form of a foot braking system, and a presently selected position PSH of a shift lever 81. While the vehicle is running forward with the forward clutch 38 placed in its engaged state, the turbine speed NT is equal to the rotating speed MN of the input shaft 58 (input shaft speed NIN), and the vehicle speed V corresponds to the rotating speed NOUT of the output shaft 66 of the continuously variable transmission 16 (output shaft speed NOUT). The accelerator operation amount Acc represents the operator's required vehicle output. The vehicle is provided with a gravity sensor 82 which generates an output signal indicative of a gradient of a roadway surface on which the vehicle is running. The vehicle is further provided with a 4-wheel-drive switch 71 and a snow-mode switch 83, which are located near the shift lever 81. The 4-wheel-drive switch 71 generates an output signal indicating whether a 4-wheel-drive mode for running the vehicle with the auxiliary drive wheels being also driven is selected by the vehicle operator, while the snow-mode switch 83 generates an output signal indicating whether a snow mode suitable for controlling the shifting action during running of the vehicle on a roadway having a low friction coefficient μ is selected by the vehicle operator.

Figure 6:
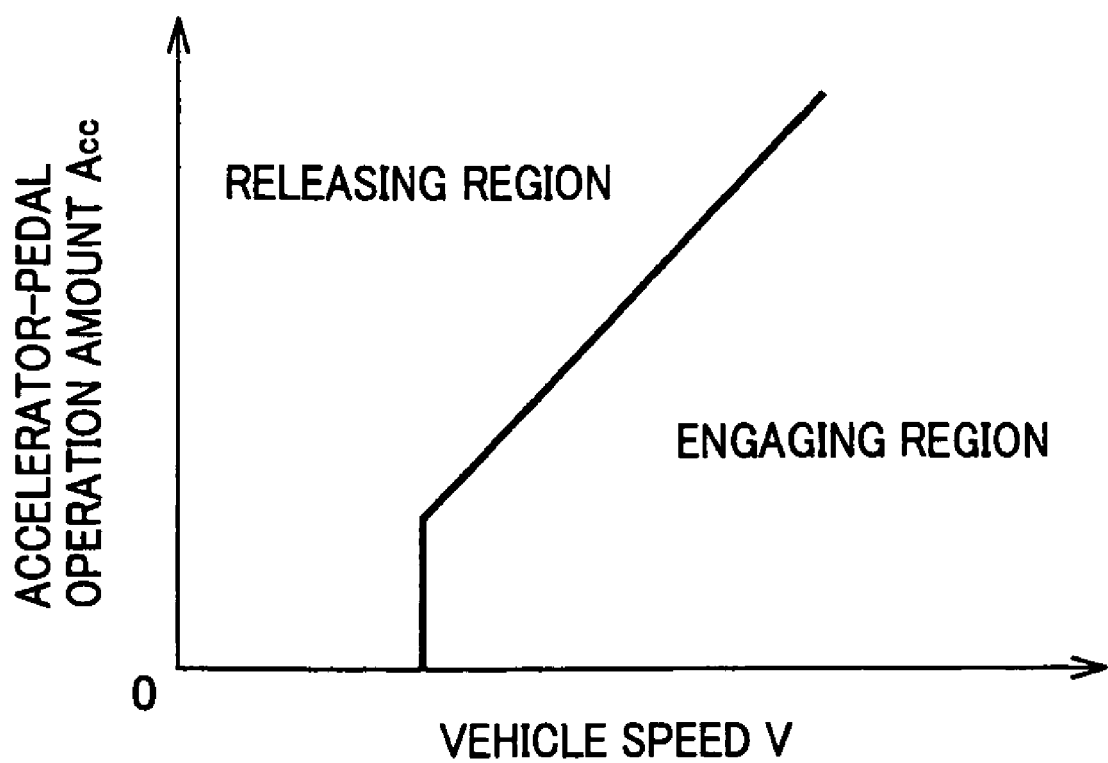
FIG. 6 is a view indicating an example of a lock-up-clutch control map used by a lock-up-clutch control device 88 shown in FIG. 3, to control engaging and releasing actions of a lockup clutch 18.

The electronic control device 70 is constituted a so-called "microcomputer" incorporating a CPU, a RAM, a ROM and an input/output interface, and the CPU operates to undergo signal processing operations according to programs stored in the ROM, while utilizing a temporary data storage function of the RAM, for performing various controls such as an output control of the engine 12, a shifting control of the continuously variable transmission 16, a belt tension control, and an engaging and releasing control of the lock-up clutch 18. The electronic control device 70 may be divided into an engine control portion and a shifting control portion if necessary. The output control of the engine 12 is effected by controlling the electronic throttle valve 20, a fuel injection device 84, and an ignition device 85, and the shifting control and belt tension control of the continuously variable transmission 16 are respectively effected under the control of the shift control device 86 and the tension control device 87. The engaging and releasing control of the lock-up clutch 18 is effected under the control of the lock-up clutch control device 88, according to a predetermined lock-up clutch control map indicated in FIG. 6 by way of example, which represents a relationship between clutch engaging and releasing regions, and the vehicle speed V and the accelerator operation amount Acc. The shift control device 86, tension control device 87 and lock-up-clutch control device 88 include solenoid valves which are closed and opened to switch hydraulic circuits, or linear solenoid valves operable to control the hydraulic pressures, according to control signals received from the electronic control device 70, and shut-off valves or switching valves closed and opened to switch hydraulic circuits according to output signals of the solenoid valves. The clutch 24 and brake 26 of the forward/reverse switching device 22 are engaged and released by mechanically switching hydraulic circuits through a manual valve connected to the shift lever 81, for example. However, the clutch 24 and brake 26 may be electrically engaged and released by the electronic control device 70.

Figure 7:
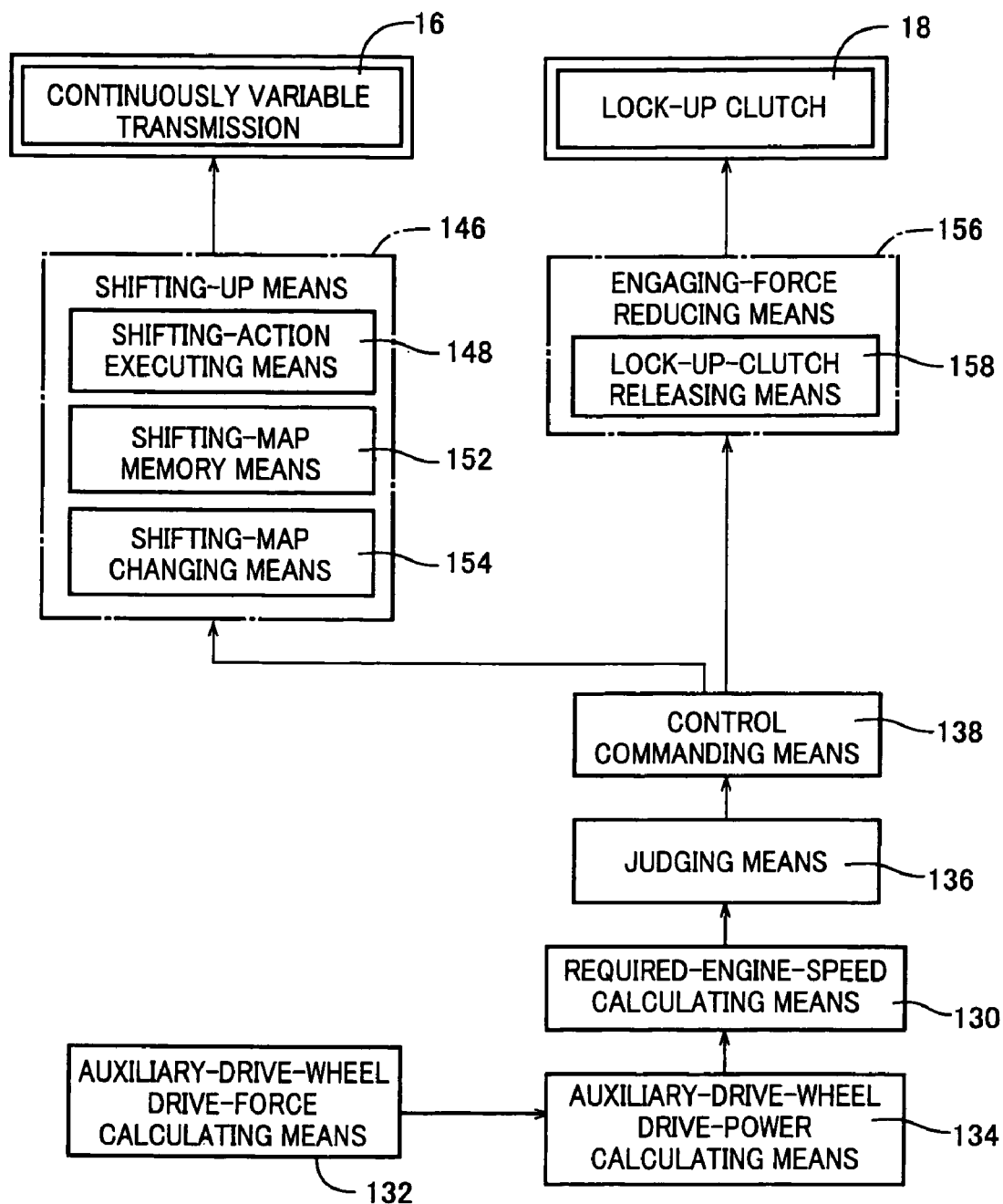
FIG. 7 is a functional block diagram showing major functional elements of the electronic control device of FIG. 3.

Referring to the block diagram of FIG. 7, there are shown functional elements of the electronic control device 70 which perform respective functions by the signal processing operations. The electronic control device 70 includes shifting-up means 146 corresponding to the shift control device 86, engaging-force reducing means 156 corresponding to the lock-up-clutch control device 88, control commanding means 138, judging means 136, auxiliary-drive-wheel drive-force calculating means 132, auxiliary-drive-wheel drive-power calculating means 134, and required-engine-speed calculating means 130.

The auxiliary-drive-wheel drive-force calculating means 132 is configured to determine whether the auxiliary drive wheels 32 should be driven to drive the vehicle on an uphill roadway. For instance, this determination is made on the basis of a gradient of the roadway surface detected by the gravity sensor 82. Upon determination that the auxiliary drive wheels 32 should be driven, the auxiliary-drive-wheel drive-force calculating means 132 calculates a presently required drive torque Q2 of the auxiliary drive wheels 32. For example, the required drive torque Q2 is calculated according to a predetermined map which represents a relationship between the gradient of the roadway surface and the required drive torque Q2. This map is obtained by experimentation conducted to assure stable running of the vehicle on the roadway surfaces having different gradients.

The auxiliary-drive-wheel drive-power calculating means 134 is configured to calculate electric power required to operate the electric motor 68 connected to the auxiliary drive wheels 32 through the differential gear device 46, clutch 44 and speed reduction gear device 38, so that the electric motor 68 is operated to drive the auxiliary drive wheels 32 to provide the drive torque Q2 calculated by the auxiliary-drive-wheel drive-force calculating means 132. Described in detail, the drive torque Q2 calculated by the auxiliary-drive-wheel drive-force calculating means 132 is initially converted into an output torque QM of the electric motor 68, on the basis of at least one of the gear ratios of the differential gear device 46 and speed reduction gear device 38, and efficiency and operating speed of the electric motor 68. Then, an electric power (current or voltage) PM required to permit the electric motor 58 to provide the calculated output torque QM is calculated according to a predetermined characteristic curve of the electric motor 68.

The required-engine-speed calculating means 130 is configured to calculate an engine speed NEn required to enable the electric generator 48 to generate the required electric power PM calculated by the auxiliary-drive-wheel drive-power calculating means 134. Described in detail, an electric-generator input speed NGn required to enable the electric generator 48 to generate the required electric power PM is initially calculated according to a characteristic curve of the electric generator 48. Subsequently, the engine speed NEn required to provide the electric-generator input speed NGn is calculated. Where the output shaft of the engine 12 and the input shaft of the electric generator 48 are directly connected to each other, the operating speed NE of the engine 12 and the input shaft speed NG of the electric generator 48 are considered each other to each other. Where the output shaft of the engine 12 and the input shaft of the electric generator 48 are connected to each other through pulleys, for example, the relationship between the engine operating speed NE and the input shaft speed NG can be obtained according to a ratio of the rotating speeds of the pulleys.

The judging means 136 is configured to compare the required engine speed NEn calculated by the required-engine-speed calculating means 130 and the actual operating speed NE of the engine 12, and to determine whether the required engine speed NEn is higher than the actual engine speed NE. If the required engine speed NEn is higher than the actual engine speed NE, this indicates that the electric power actually generated by the electric generator 48 is smaller than the required auxiliary-drive-wheel driving electric power PM. In this case, the control execution means 138 described above is operated to effect the drive force control according to the principle of the present invention, in view of the fact that the vehicle to which the present invention is applied is not provided with a battery for supplying electric power to the electric motor 68 for driving the rear wheels 32, and that the electric power for driving the rear wheels 32 is only the electric power concurrently generated by the electric generator 48. If the required engine speed NEn is lower than or equal to the actual engine speed NE, this indicates that the electric generator 48 can provide the required auxiliary-drive-wheel driving electric power PM. In this case, the drive force control according to the present invention is not effected, and the shifting control is effected according to the shifting map stored in shifting-map memory means 152. It is noted that the actual operating speed NE of the engine 12 is detected by the engine speed sensor 72 provided on the engine 12.

The control commanding means 138 is configured to command the shifting-up means 146 and engaging-force reducing means 156 described below to effect the drive force control according to the present invention. As described below, the control commanding means 138 commands the engaging-force reducing means 156 to release the lock-up clutch 18, and commands the shifting-up means 146 to shift up the continuously variable transmission 16. The control commanding means 138 is arranged to command the shifting-up means 146 to shift up the continuously variable transmission 16, only after confirming that the lock-up clutch 18 held in the engaged state has been released by the engaging-force reducing means 156, more precisely, the lock-up clutch 18 has been brought into a partially engaged state or fully released state. This arrangement is to prevent stalling of the engine 12 which would take place if the continuously variable transmission 16 is shifted up in the engaged state of the lock-up clutch 18.

The shifting-up means 146, which is commanded by the control commanding means 138 to effect the drive force control according to the present invention by shifting up the continuously variable transmission 16, includes shifting-map memory means 152, shifting-map changing means 154 and shifting-action executing means 148.

The shifting-map memory means 152 stores data necessary for controlling the shifting action of the continuously variable transmission 16, the shifting map and required hydraulic pressure map indicated in FIGS. 4 and 5 by way of example, and a new shifting map which obtained by the shifting-map changing means 154 described below.

Figure 8:
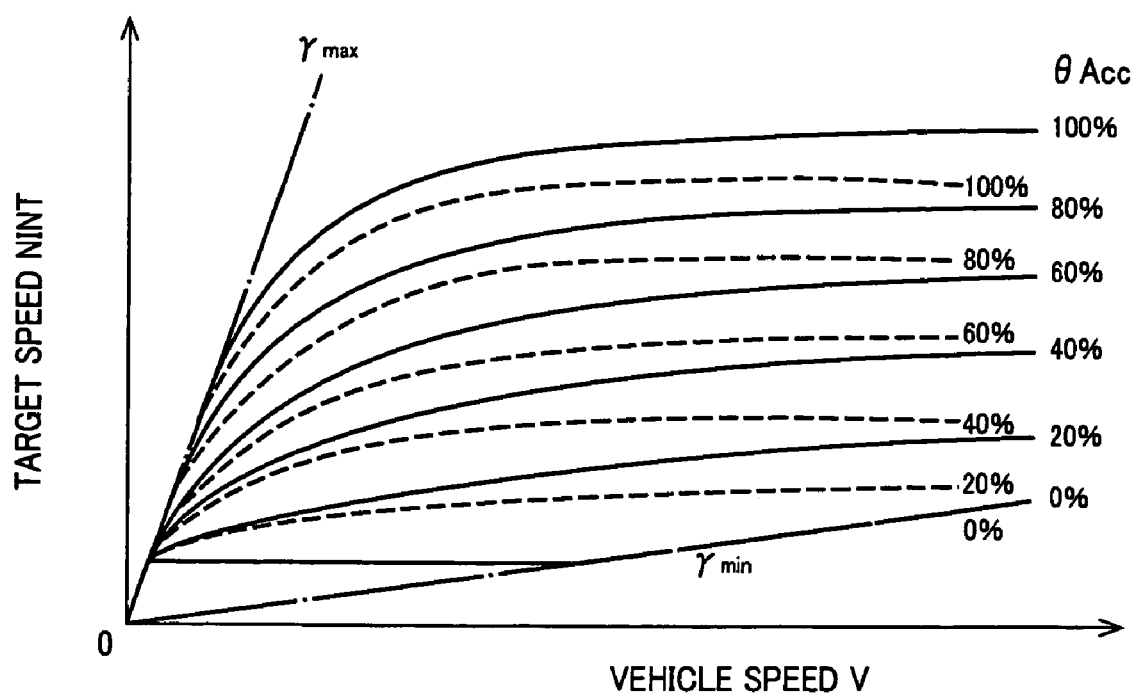
FIG. 8 is a view indicating a example of a change of the shifting map by shifting-map changing means shown in FIG. 7.

The shifting-map changing means 154 is configured to change the shifting map stored in the shifting-map memory means 152 into a new shifting map, which is stored in the shifting-map memory means 152. According to the new shifting map, the target input shaft speed NINT is lower than that according to the shifting map which has been stored in the shifting-map memory means 152, for the same accelerator operating amount and the same vehicle speed. That is, the new shifting map is formulated to reduce the speed ratio of the continuously variable transmission 16. An example of the new shifting map is indicated by broken lines in FIG. 8 by way of example.

The shifting executing means 148 is configured to shift the continuously variable transmission 16 on the basis of the vehicle running condition, and according to the new shifting map which has been obtained by the shifting-map changing means 154 and stored in the shifting-map memory means 152. Described in detail, the target input shaft speed NINT is calculated on the basis of the accelerator operation amount Acc and vehicle speed V and according to the new shifting map, and the continuously variable transmission 16 is shifted according to a difference between the actual input shaft speed NIN and the target value NINT, such that the actual input shaft speed MN coincides with the target value INIT. Described more specifically, the solenoid valves of the shift control device 86 are feedback-controlled to control the fluid flows to and from the hydraulic cylinder of the variable-diameter input pulley 60.

The engaging-force reducing means 156 includes lock-up-clutch releasing means 158, which is commanded by the control commanding means 138 to effect the drive force control according to the present invention, that is, to release the lock-up clutch 18 of the torque converter 14, if the lock-up clutch 18 has been placed in the engaged state. As a result, the torque converter 14 has a slipping action. Described in detail, the pressurized fluid is fed into the releasing fluid chamber of the lock-up clutch 18, so that the lock-up clutch 18 is partially engaged or fully released, to cause slipping between the pump and turbine impellers 14$p$, 14$t$, without rotation of these impellers as a unit.

Figure 9:
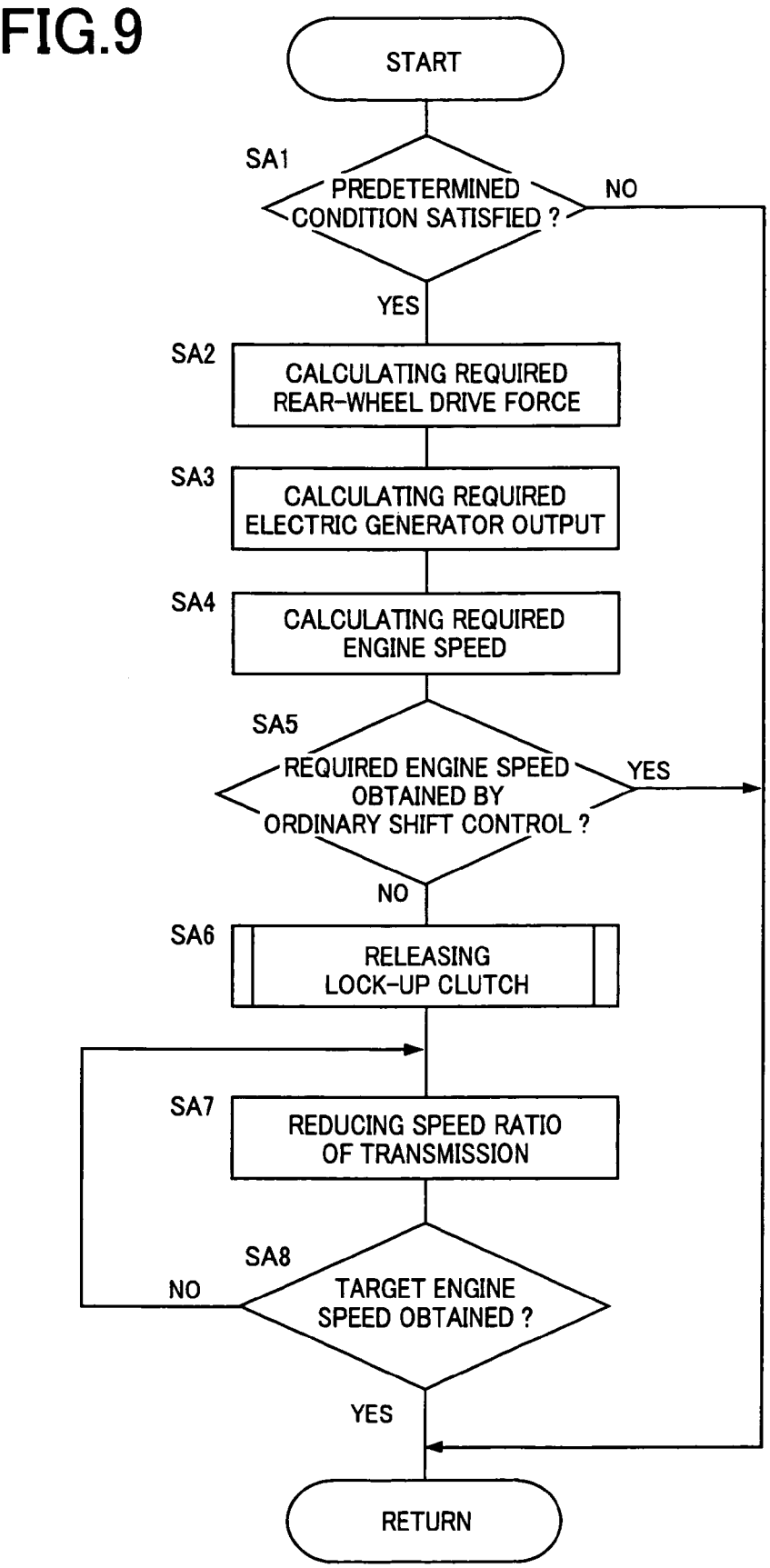
FIG. 9 is a flow chart illustrating a major control function of the electronic control device of FIG. 3.

Referring to the flow chart of FIG. 9, there is illustrated a major control function of the electronic control device 70, namely, control operations to release the lock-up clutch 18 of the torque converter 14 and reduce the gear ratio of the automatic continuously variable transmission 16, for thereby controlling the vehicle drive force while the auxiliary drive wheels 32 are driven by the electric motor 68.

Step SA1 (hereinafter "step" being omitted) is implemented to determine whether the vehicle is placed in the 4-wheel-drive mode. For example, this determination is made by determining whether the 4-wheel-drive switch 71 is placed in the ON state. If a negative determination is obtained in SA1, this indicates that the vehicle is not placed in the 4-wheel-drive mode, and that the rear wheels 32 which are the auxiliary drive wheels will not be driven. In this case, the routine of the present flow chart is terminated. If an affirmative determination is obtained in SA1, the control flow goes to SA2 and the subsequent steps.

In SA2 corresponding to the auxiliary-drive-wheel drive-force calculating means 132, the drive torque Q2 required to drive the auxiliary drive wheels in the form of the rear wheels 32 for stable running of the vehicle is calculated. For example, the values of the drive torque Q suitable for driving the auxiliary drive wheels 32 for stable running of the vehicle on uphill roadway surfaces having different values of gradient are obtained by experimentation, and a map representative of the values of the drive torque Q for the respective different gradient values is stored in a memory. The drive torque Q2 is calculated on the basis of the gradient of the roadway surface measured by the gravity sensor 82 provided on the vehicle, and by reference to the stored map, during running of the vehicle.

In SA3 corresponding to the auxiliary-drive-wheel drive-power calculating means 134, the drive power PM required to enable the electric motor 68 connected to the auxiliary drive wheels 32, to be driven for driving the auxiliary drive wheel 32R with the drive torque Q2 calculated in SA2 is calculated. Described in detail, the drive torque Q2 of the auxiliary drive wheel 32R is converted into an output torque QM of the electric motor 68, on the basis of at least one of the gear ratios of the differential gear device 46 and speed reduction gear device 38 disposed between the rear drive wheel 32R and the electric motor 68, and operating efficiency and speed of the electric motor 68. The drive power PM (electric current and voltage) required for obtaining the output torque QM of the electric motor 68 is calculated according to the predetermined characteristic curve of the electric motor 68.

In SA4 corresponding to the required-engine-speed calculating means 130, the engine speed NE required to enable the electric generator 48 to generate the drive power PM calculated in SA3 and required to drive the auxiliary drive wheels is calculated. Described in detail, an electric-generator input speed NGn required to enable the electric generator 48 to generate the calculated auxiliary-drive-wheel drive power PM is initially calculated according to a characteristic curve of the electric generator 48. Then, an engine speed NEn required for obtaining the required electric-generator input speed NGn is calculated. Where the output shaft of the engine 12 and the input shaft of the electric generator 48 are directly connected to each other, the operating speed NE of the engine 12 and the input shaft speed NG of the electric generator 48 are considered equal to each other. Where the output shaft of the engine 12 and the input shaft of the electric generator 48 are connected to each other through pulleys, for instance, the relationship between the speeds NE and NG can be obtained on the basis of the speed ratio of the pulleys.

In the following step SA5 corresponding to the judging means 136, the required engine speed NEn calculated in SA4 and the actual operating speed NE of the engine 12 are compared with each other, to determine whether the required engine speed NEn is higher than the actual engine speed NE, for determining whether the required engine speed NEn is actually obtained by an ordinary shift control of the transmission. If the required engine speed NEn is higher than the actual engine speed NE, that is, the required engine speed NEn is not actually obtained by the ordinary shift control, a negative determination is obtained in SA5. This indicates that the electric power generated by the electric generator 48 is less than the auxiliary-drive-wheel drive power PM, according to the ordinary shift control using the ordinary shifting map stored in the shifting-map memory means 152. In this case, the control flow goes to SA6 and the following steps. If the required engine speed NEn is lower than or equal to the actual engine speed NE, namely, if an affirmative determination is obtained in SA5, this indicates that the electric power generated by the electric generator 48 is sufficient to provide the auxiliary-drive-wheel drive power PM according to the shifting control using the ordinary shifting map stored in the shifting-map memory means 152. In this case, the ordinary shifting control according to the shifting map stored in the shifting-map memory means 142 is effected, and the routine of the present flow chart is terminated, so that the vehicle drive force control according to the present invention will not be implemented.

Figure 10:
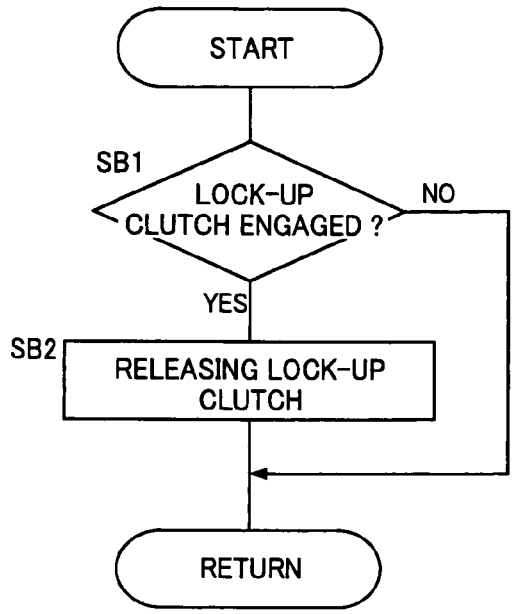
FIG. 10 is a flow chart illustrating a lock-up-clutch releasing routine shown in FIG. 9.

In SA6 corresponding to the engaging-force reducing means 156, a lock-up-clutch releasing routine illustrated in FIG. 10 is executed. In SB1 of FIG. 10, a determination as to whether the lock-up clutch 18 provided in the torque converter 14 of the vehicle is placed in the engaged state. For instance, this determination is made by determining whether a signal for engaging the lock-up clutch 18 has been fed from the electronic control device 70 to the lock-up-clutch control device 88 described above. If a negative determination is obtained in SB1, this indicates that the lock-up clutch 18 is placed in the released state, and the present routine is terminated. If an affirmative determination is obtained in SB1, the control flow goes to SB2 in which the pressurized fluid is fed into the releasing fluid chamber of the lock-up clutch 18, under the control of the lock-up-clutch control device 88, so that the lock-up clutch 18 which has been placed in the engaged state is brought into the released state. It is noted that the lock-up clutch 18 must be released prior to the following step SA7, for the purpose of preventing stalling of the engine 12 upon reduction of the speed ratio of the continuously variable transmission 16 in the step SA7.

Referring back to FIG. 9, SA7 corresponding to the shifting-up means 146 is implemented to change the shifting map stored in the shifting-map memory means 152, to a new shifting map according to which the target input shaft speed NINT for the same accelerator operation amount and the same vehicle speed is lower than according to the shifting map which has been stored in the shifting-map memory means 152. Namely, the speed ratio of the continuously variable transmission 16 is made lower according to the new shifting map. An example of the shifting map newly stored in the shifting-map memory means 152 is indicated by broken lines in FIG. 8. The shifting action of the continuously variable transmission 16 is controlled on the basis of the vehicle running condition and according to the new shifting map obtained in SA7.

SA8 is implemented a predetermined time after implementation of SA7, to compare the operating speed NE of the engine 12 after the shifting map is changed in SA7, with the required engine speed NEn calculated in SA4. If the engine speed NE is higher than the required engine speed NEn, an affirmative determination is obtained in SA8. This indicates that an amount of electric power PG generated by the electric generator 48 is larger than the required auxiliary-drive-wheel drive power PM. In this case, the present routine is terminated. If the engine speed NE is still lower than the required engine speed NEn, the change of the shifting map in SA7 is not sufficient, and the control flow goes back to SA7 to further change the shifting map, that is, to reduce the speed ratio of the continuously variable transmission 16. The predetermined time indicated above is a length of time sufficient to permit the operating speed NE of the engine 12 to change as a result of reduction of the speed ratio of the continuously variable transmission 16 in SA7.

The present embodiment is configured such that the engaging force of the torque converter 14 is reduced during driving of the auxiliary drive wheels 32, so that the operating speed NE of the engine 12 rises according to a load of the torque converter 14, while at the same time the continuously variable transmission 16 is shifted up, whereby the slipping of the main drive wheels 30 can be reduced. Further, the rise of the operating speed of the engine 12 causes an increase of the amount of electric power PG generated by the electric generator 48, permitting an increase of the drive torque of the auxiliary drive wheels 32 and a stable 4-wheel-drive control of the vehicle.

The present embodiment is further configured such that the lock-up clutch 18 provided in the torque converter 14 is released during driving of the auxiliary drive wheels 32, so that the load acting on the torque converter is given to the engine 12 to cause a rise of the engine speed NE.

The present embodiment is further configured such that the continuously variable transmission 16 is shifted up to a higher-gear position (to reduce its speed ratio) under the control of the shifting-map changing means 154, during starting of the vehicle at a low speed during which the drive wheels tend to easily slip. The shift-up action of the transmission positively causes an increase of the amount of slipping of the torque converter 14, for thereby assuring increased stability of starting of the vehicle.

The present embodiment is further configured such that the reduction of the engaging force of the torque converter 14 under the control of the engaging-force reducing means 156 and the shift-up action of the continuously variable transmission 16 under the control of the shifting-up means 146 take place during starting of the vehicle. Accordingly, the electric generator 48 can generate a sufficient amount of electric power for driving the auxiliary drive wheels 32 to provide an assisting vehicle drive force for assuring increased stability of starting of the vehicle. In the absence of the assisting vehicle drive force, the main drive wheels would tend to easily slip during starting of the vehicle.

The present embodiment is further configured such that the required drive force Q2 of the auxiliary drive wheels 32 is calculated by the auxiliary-drive-wheel drive-force calculating means 132, and the judging means 136 determines whether the amount of electric power PG generated by the electric generator is sufficient to provide the required amount of electric power PM for obtaining the required drive force Q2 of the auxiliary drive wheels 32 calculated by the auxiliary-drive-wheel drive-force calculating means 132. Only when the judging means 136 determines that the required amount of electric power PM for obtaining the required drive force Q2 of the auxiliary drive wheel 32 is not obtained, the engaging force of the torque converter 14 is reduced, and the continuously variable transmission 16 is shifted up. This arrangement prevents unnecessary reduction of the engaging force of the torque converter 14, and an unnecessary shift-up action of the transmission.

There will be described other embodiments of this invention. In the following description, the same reference signs will be used to identify the same elements of the embodiments.

Second Embodiment

The present second embodiment is also applicable to the vehicle and the vehicular drive system shown in FIGS. 1, 2 and 3. Referring to the block diagram of FIG. 11 corresponding to that of FIG. 7, there are shown functional elements of the electronic control device 70 constructed to perform signal processing operations according to the present second embodiment. The electronic control device 70 includes the shifting-up means 146 corresponding to the shift control device 86, the engaging-force reducing means 156 corresponding to the lock-up-clutch control device 88, and the control commanding means 138. Unlike the electronic control device 70 shown in FIG. 7, the electronic control device 70 shown in FIG. 11 does not include the judging means 136, the auxiliary-drive-wheel drive-force calculating means 132, the auxiliary-drive-wheel drive-power calculating means 134, and the required-engine-speed calculating means 130.

The control commanding means 138 is configured to command the shifting-up means 146 and the engaging-force reducing means 156 to effect the vehicle drive force control according to the present invention, when the vehicle drive force control according to the present invention is selected manually by the vehicle operator, during starting of the vehicle. For instance, the vehicle drive force control is manually selected by the operator when the 4-wheel-drive switch 71 and the snow-mode switch 83 are both placed in the ON state. As in the first embodiment described above, the control commanding means 138 is configured to command the shifting-up means 146 to shift up the continuously variable transmission 16 (hereinafter referred to as "automatic transmission 16") only after the control commanding means 138 has confirmed that the lock-up clutch 18 has been placed in the partially engaged state or fully released state under the control of the engaging-force reducing means 156. This confirmation is made in order to prevent stalling of the engine which would take place if the automatic transmission 16 is shifted up while the lock-up clutch 18 is placed in the fully engaged state.

The shifting-up means 146 is commanded by the control commanding means 138 to effect the vehicle drive force control by shifting up the automatic transmission 16. The shifting-up means 146 includes the shifting-map memory means 152, a shifting-map switching means 150, and the shifting-action executing means 148.

The shifting-map memory means 152 stores information necessary for shifting the automatic transmission 16, for example, shifting maps as indicated in FIG. 4, and a required hydraulic pressure control map as indicated in FIG. 5. In the present embodiment, the shifting-map memory means 152 stores a plurality of shifting maps from which the shifting map used for controlling the shifting action of the automatic transmission 16 is selected by the shifting-map switching means 150, as described below.

The shifting-map switching means 150 is configured to select one of the plurality of shifting maps stored in the shifting-map memory means 152, for controlling the shifting action of the automatic transmission 16, while taking account of the running condition of the vehicle. For instance, the vehicle running condition includes the running mode and the roadway surface condition.

The shifting-action executing means 148 is configured to effect the shifting action of the automatic transmission 16, on the basis of the vehicle running condition and according to the shifting map selected by the shifting-map switching means 150 and stored in the shifting-map memory means 152. The engaging-force reducing means 156 includes the lock-up clutch releasing means 158, and is commanded by the control commanding means to effect the vehicle drive force control by releasing the lock-up clutch 18 of the torque converter 14 provided on the vehicle, if the lock-up clutch 18 is placed in the engaged state. As a result, the torque converter 14 undergoes a slipping action. The shifting-action executing means 148 and the engaging-force reducing means 156 are identical with those in the first embodiment, and will not be described in detail.

Figure 12:
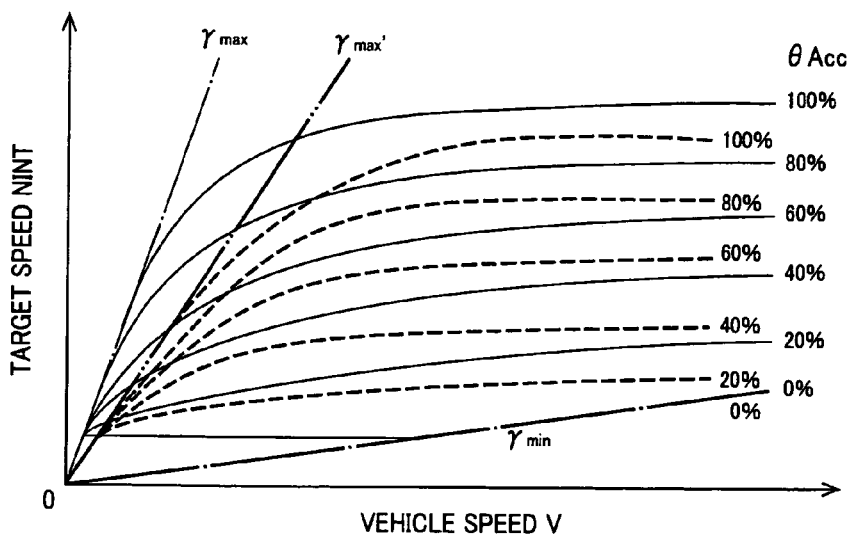
FIG. 12 is a view indicating an example of a plurality of shifting maps stored in shifting-map memory means 152 shown in FIG. 11.

FIG. 12 indicating an example of a shifting map additionally stored in the shifting-map memory means 152, in addition to the ordinary shifting map indicated in FIG. 4. In this figure, broken lines indicate the additional shifting map, while solid lines indicate the ordinary shifting map. For comparison of the additional and ordinary shifting maps, these two maps are superimposed on each other. Comparing the additional shifting map with the ordinary shifting map, it is recognized that a gradient of a two-dot chain line indicative of the maximum speed ratio $\gamma max'$ in the additional shifting map is lower than that of a one-dot chain line indicative of the maximum speed ratio $\gamma max$ in the ordinary shifting map. Namely, the maximum speed ratio $\gamma max'$ available according to the additional shifting map is lower than the maximum speed ratio $\gamma max$ available according to the ordinary shifting map. Accordingly, the maximum speed ratio $\gamma max'$ upon starting of the vehicle when the additional shifting map is selected for shifting the automatic transmission 16 is lower than the maximum speed ratio $\gamma max$ upon starting of the vehicle when the ordinary shifting map is selected. Therefore, the automatic transmission 16 is forcibly shifted to a lower speed during starting of the vehicle when the additional shifting map is selected for controlling the automatic transmission 16 during starting of the vehicle. It is also noted that the target input shaft speed NINT for the same accelerator operation amount and the same vehicle speed is lower according to the additional shifting map, than that according to the ordinary shifting map, so that the speed ratio is made lower according to the additional shifting map.

Figure 13:
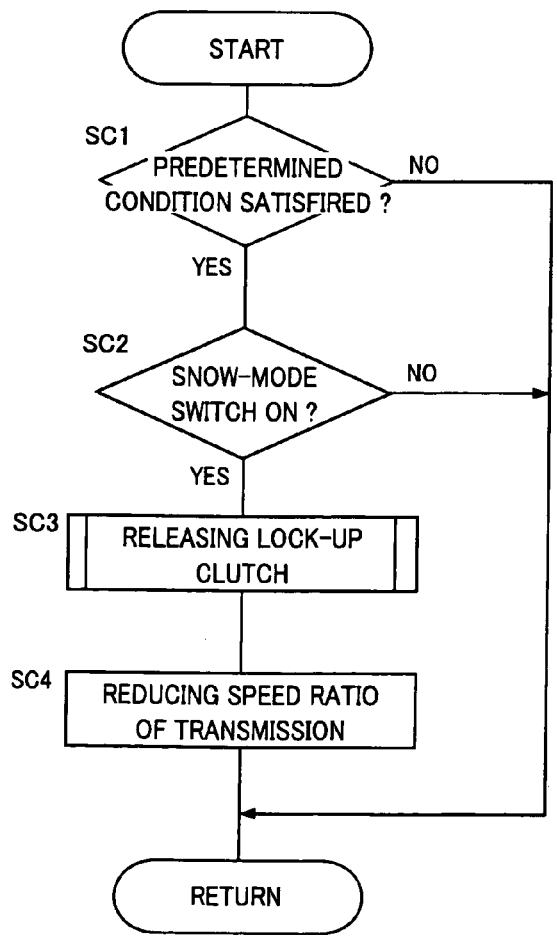
FIG. 13 is a flow chart illustrating a major control function of the electronic control device of the above-indicated another embodiment.

Referring to the flow chart of FIG. 13, there is illustrated a major control function of the electronic control device 70 according to the present invention, namely, control operations to release the lock-up clutch 18 of the torque converter 14 and reduce the gear ratio of the automatic transmission 16, for thereby controlling the vehicle drive force while the auxiliary drive wheels 32 are driven. The flow chart of FIG. 13 replaces the flow chart of FIG. 9.

SC1 and SC2 correspond to the control commanding means 138. SC1 corresponding to SA1 is initially implemented to determine whether the predetermined condition is satisfied. For example, the predetermined condition is satisfied when the vehicle is placed in the 4-wheel-drive mode, or while the vehicle is in the process of starting. For instance, this determination is made by determining whether the 4-wheel-drive switch 71 is placed in the ON state, or whether the vehicle speed detected by the vehicle speed sensor 52R, 52L, 54R, 54L is raised from zero. If a negative determination is obtained in SC1, this indicates that the vehicle is not placed in the 4-wheel-drive mode, and that the rear wheels 32 which are the auxiliary drive wheels will not be driven. Alternatively, the negative determination indicates that the vehicle is stationary. In either one of these cases, the routine of the present flow chart is terminated. If an affirmative determination is obtained in SC1, the control flow goes to SC2 and the subsequent steps.

SC2 is then implemented to determine whether the vehicle drive force control according to the present embodiment must be effected or not. For instance, this determination is made by determining whether the snow-mode switch 82 is placed in the ON state. If an affirmative determination is obtained in SC2, this indicates that the vehicle operator recognizes a vehicle running on a roadway surface having a low friction coefficient μ, and desires to start the vehicle with the auxiliary drive wheels 32 being driven. In this case, the control flow goes to SC3 and the subsequent steps. If a negative determination is obtained in SC2, the vehicle drive force control according to the present embodiment is not to be effected, and the routine of the present flow chart is terminated.

In the following step SC3 corresponding to the engaging-force reducing means 156, the lock-up-clutch releasing routine illustrated in FIG. 10 is executed. In SB1 of FIG. 10, a determination as to whether the lock-up clutch 18 provided in the torque converter 14 of the vehicle is placed in the engaged state. For instance, this determination is made by determining whether a signal for engaging the lock-up clutch 18 has been fed from the electronic control device 70 to the lock-up-clutch control device 88 described above. If a negative determination is obtained in SB1, this indicates that the lock-up clutch 18 is placed in the released state, and the present routine is terminated. If an affirmative determination is obtained in SB1, the control flow goes to SB2 in which the pressurized fluid is fed into the releasing fluid chamber of the lock-up clutch 18, under the control of the lock-up-clutch control device 88, so that the lock-up clutch 18 which has been placed in the engaged state is brought into the released state. It is noted that the lock-up clutch 18 must be released prior to the following step SC4, for the purpose of preventing stalling of the engine 12 upon reduction of the speed ratio of the automatic transmission 16 in the step SC4.

Referring back to FIG. 13, SC4 corresponding to the shifting-up means 146 is implemented to change the shifting map stored in the shifting-map memory means 152, from the ordinary shifting map which has been used, to the additional shifting map. As a result, the maximum speed ratio used for starting of the vehicle is changed from the value γmax according to the ordinary shifting map, to the value γmax' according to the additional shifting map. Further, the target input shaft speed NINT for the same accelerator operation amount and the same vehicle speed is lower according to the additional shifting map, than that according to the ordinary shifting map, so that the speed ratio is made lower according to the additional shifting map.

The present embodiment is configured such that the automatic transmission 16 is forcibly shifted up during starting of the vehicle, so that the output load of the torque converter 14 is increased, and the amount of slipping of the torque converter 14 is positively increased, whereby the operating speed NE of the engine 12 is raised. Accordingly, the amount of electric power generated by the electric generator 48 can be increased, assuring high stability of starting of the vehicle during which the drive wheels would tend to slip.

Third Embodiment

Figure 11:
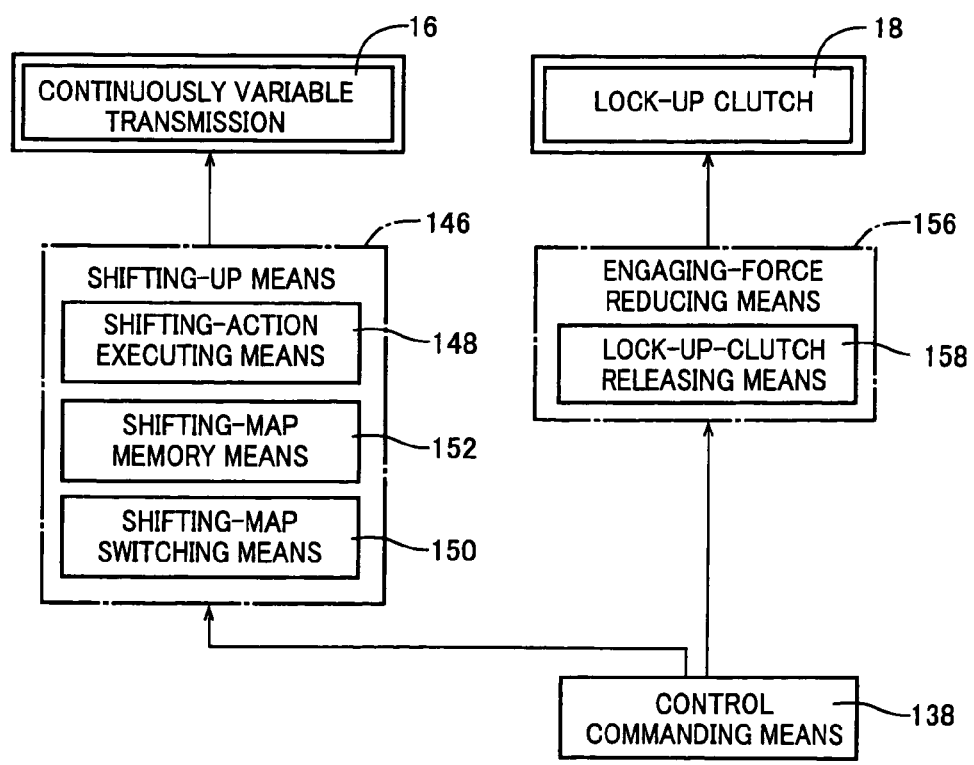
FIG. 11 is a functional block diagram showing major functional elements of the electronic control device according to another embodiment of this invention.
Figure 14:
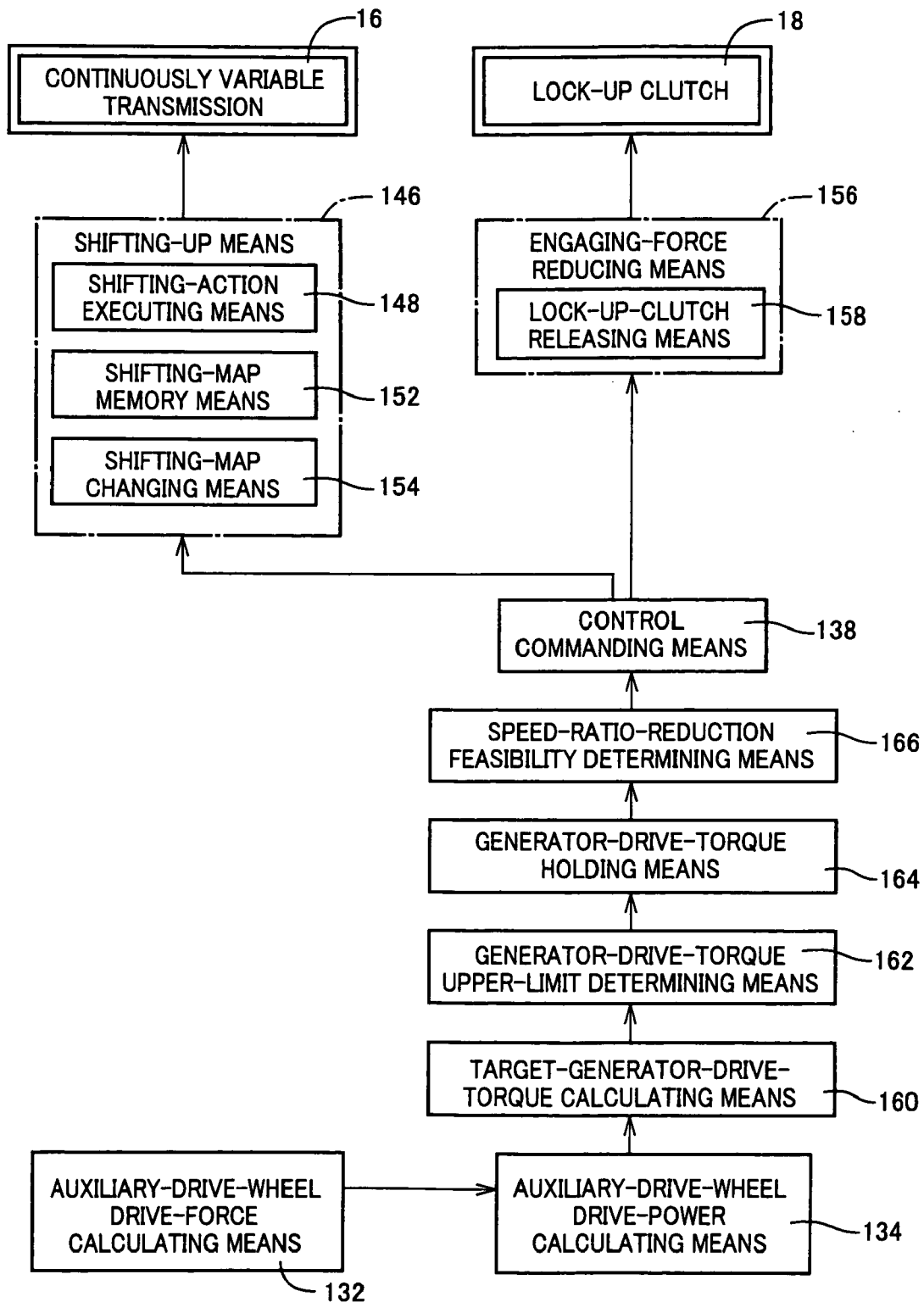
FIG. 14 is a functional block diagram showing major functional elements of the electronic control device according to a further embodiment of this invention.

Referring to the block diagram of FIG. 14 corresponding to those of FIGS. 7 and 11, there are shown functional elements of the electronic control device 70 constructed to perform signal processing operations according to the present third embodiment. The electronic control device 70 according to the present embodiment is identical with that according to the embodiment of FIG. 7, except in that the required-engine-speed calculating means 130 and the judging means 136 are replaced by target-generator-drive-torque calculating means 160, generator-drive-torque upper-limit determining means 162, generator-drive-torque holding means 164, and speed-ratio-reduction feasibility determining means 166.

Figure 15:
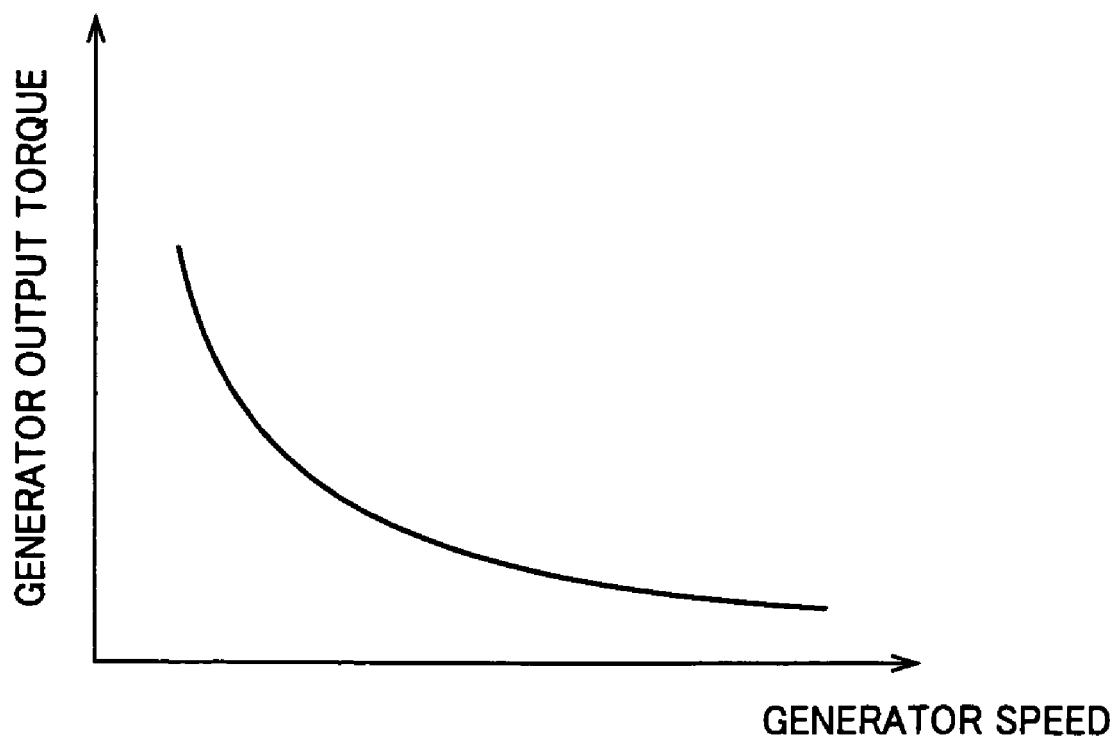
FIG. 15 is a view indicating an example of output characteristics of an electric generator used in the embodiment of FIG. 14.

The target-generator-drive-torque calculating means 160 is configured to calculate a target drive torque TGm provided to drive the electric generator 48 for generating the electric power PM which is required to drive the auxiliary drive wheels and which is calculated by the auxiliary-drive-wheel drive-power calculating means 134. The target-generator-drive-torque calculating means 160 calculates the target drive torque TGm on the basis of the required electric power PM to drive the auxiliary drive wheels, that is, the target output of the electric generator 48 to generate the required amount of electric power, and according to a predetermined stored relationship between the target drive torque TGm and the required output. The generator-drive-torque upper-limit determining means 162 is configured to determine whether the drive torque TG of the electric generator 48 calculated by the target-generator-drive-torque calculating means 160 is equal to or smaller than a predetermined upper limit. This upper limit is determined on the basis of a constant output curve of the electric generator 48 indicated in FIG. 15 by way of example, such that the output of the electric generator 48 is held constant with a decrease of the torque and an increase of the operating speed. The generator-drive-torque holding means 164 is configured to hold the drive torque TG of the electric generator 48 at the upper limit, when the generator-drive-torque upper-limit determining means 162 determines that the drive torque TG of the electric generator 48 is not equal to or small than the upper limit. The speed-ratio-reduction feasibility determining means 166 is configured to determine whether the reduction of the speed ratio γ of the automatic transmission 16 from the present value is feasible. This determination is made on the basis of the load actually acting on the engine 12, the capacity of the torque converter 14 and the vehicle condition.

The control commanding means 138 is operated during starting of the vehicle, for example, after the drive torque TG of the electric generator 48 required to provide the target output of the electric generator 48 to generate the required amount of electric power has been calculated by the target-generator-drive-torque calculating means 160, and if the speed-ratio feasibility determining means 166 has determined that the speed ratio γ of the automatic transmission 16 can be reduced from the present value. The control commanding means 138 commands the shifting-up means 146 to shift up the automatic transmission 16, and commands the engaging-force reducing means 156 to reduce the engaging torque of the lock-up clutch 18 of the torque converter 14, so as to obtain the target drive torque TGm of the electric generator 48 required to obtain the target output that should be generated by the electric generator 48.

Figure 16:
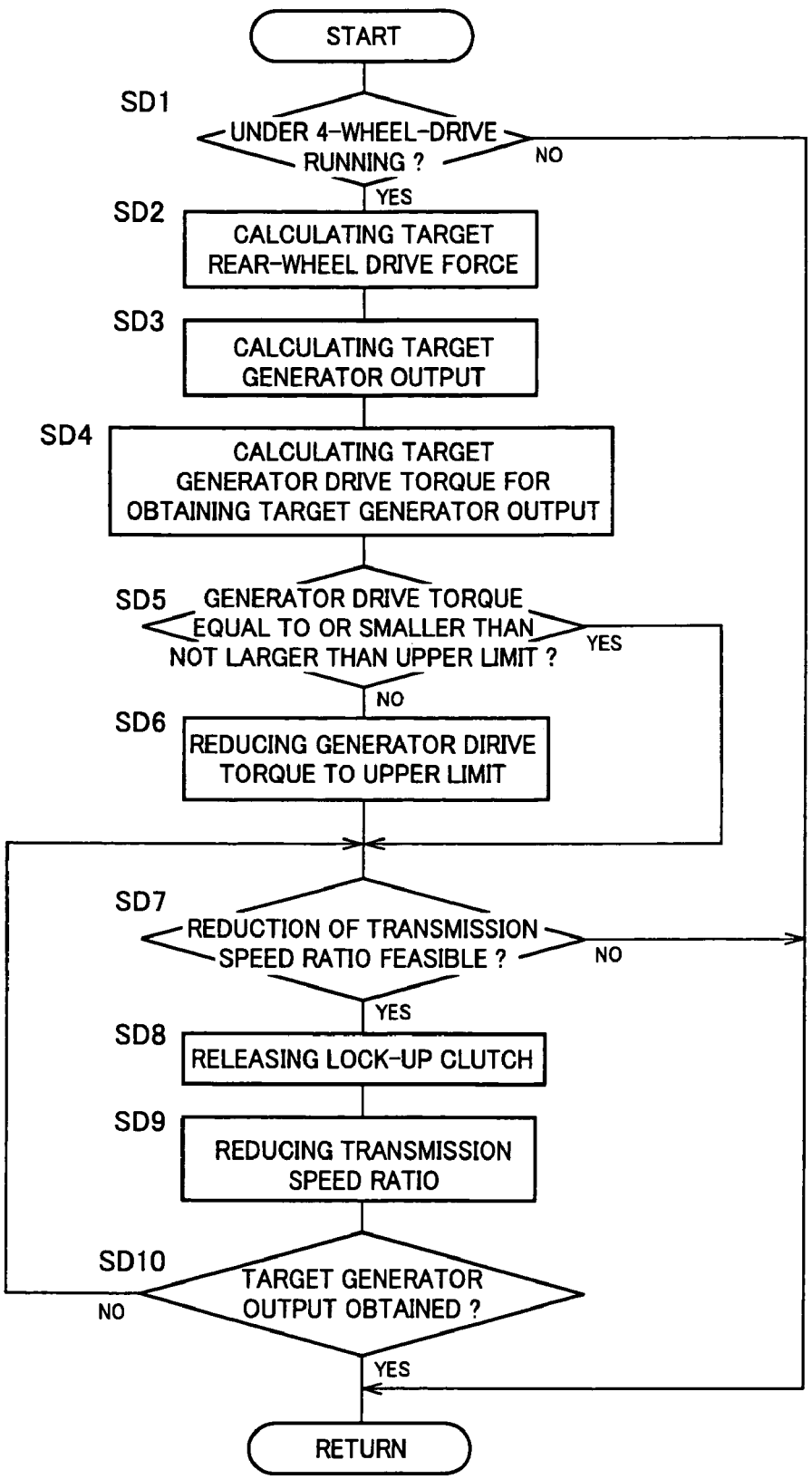
FIG. 16 is a flow chart illustrating a major control function of the electronic control device of the embodiment of FIG. 14.

Referring to the flow chart of FIG. 16, there is illustrated a major control function of the electronic control device 70 according to the present embodiment. The routine illustrated in the flow chart of FIG. 16 is executed while the vehicle is placed in the 4-wheel-drive mode, and is different from that of the flow chart of FIG. 9, in that SA4 and SA5 are replaced by SD4-SD7. SD1-SD3 are identical with SA1-SA3, while SD8-SD10 are identical with SA6-SA8.

In SD4 of FIG. 16 corresponding to the target-generator-drive-torque calculating means 160, the drive torque TG of the electric generator 48 required to provide the electric power PM which is required to drive the auxiliary drive wheels and which is calculated by the auxiliary-drive-wheel drive-power calculating means 134, namely, required to provide the target output of the electric generator 48 to generate the required amount of electric power is calculated on the basis of the required electric power PM and according to the predetermined stored relationship between the drive torque TG and the required output. Then, SD5 corresponding to the generator-drive-torque upper-limit determining means 162 is implemented to determine whether the drive torque TG of the electric generator 48 calculated in SD4 is equal to or smaller than the upper limit. If an affirmative determination is obtained in SD5, the control flow skips the following step SD6. If a negative determination is obtained in SD5, the control flow goes to SD6 corresponding to the generator-drive-torque holding means 164, in which the target drive torque TG of the electric generator 48 is limited to the upper limit. The control flow then goes to SD7 corresponding to the speed-ratio-reduction feasibility determining means 166, to determine whether it is feasible to reduce the speed ratio γ of the automatic transmission 16 from the present value. This determination is made on the basis of the actual load condition of the engine 12, the capacity of the torque converter 14 and the vehicle condition. If a negative determination is obtained in SD7, the present routine is terminated. If an affirmative determination is obtained in SD7, the control flow goes to SD8 and the subsequent steps, to shift up the automatic transmission 16 and reduce the engaging torque of the lock-up clutch 18 of the torque converter 14, for obtaining the target drive torque TG of the electric generator 48 to provide the required output to generate the required amount of electric power.

The present embodiment is configured to shift up the automatic transmission 16 and reduce the engaging torque of the lock-up clutch 18 of the torque converter 14, for obtaining the target drive torque TG of the electric generator 48 to provide the required output to generate the required amount of electric power. Thus, the present embodiment provides the same advantages as the preceding embodiments.

Fourth Embodiment

Figure 17:
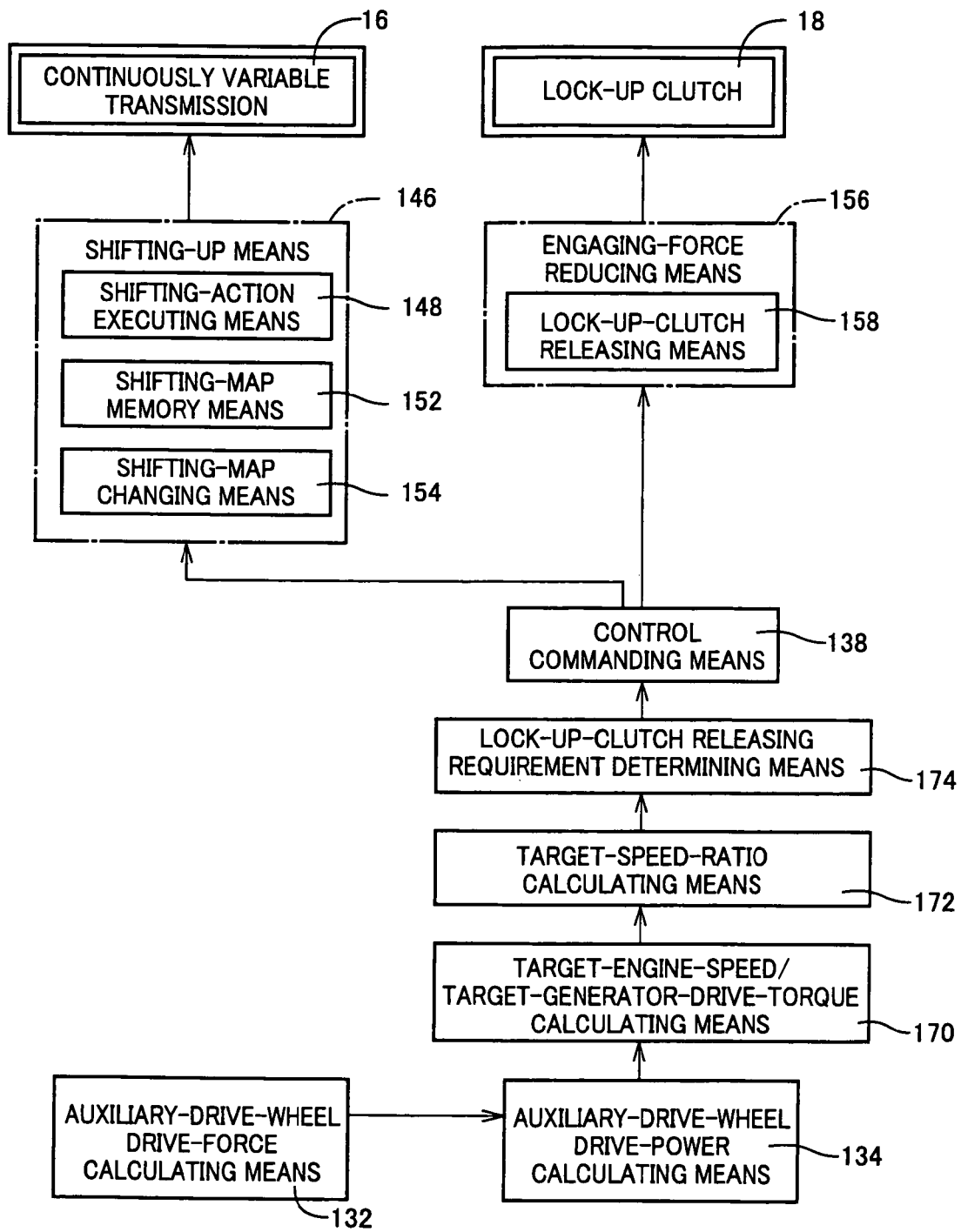
FIG. 17 is a functional block diagram showing major functional elements of the electronic control device according to another embodiment of the invention.

Referring to the block diagram of FIG. 17 corresponding to those of FIGS. 7, 11 and 14, there are shown functional elements of the electronic control device 70 constructed to perform signal processing operations according to the present fourth embodiment. The electronic control device 70 according to the present embodiment is identical with that according to the embodiment of FIG. 14, except in that the target-generator-drive-torque calculating means 160, generator-drive-torque upper-limit determining means 162, generator-drive-torque holding means 164, and speed-ratio-reduction feasibility determining means 166 are replaced by target-engine-speed/target-generator-drive-torque calculating means 170, target-speed-ratio calculating means 172 and lock-up-clutch releasing requirement determining means 174.

The target-engine-speed/target-generator-drive-torque calculating means 170 is configured to calculate a target engine speed NEm required to provide the target output of the electric generator 48 to generate the required amount of electric power, and the target drive torque TG of the electric generator 48 required to provide the target output thereof, according to a predetermined stored map and on the basis of the vehicle condition as represented by the throttle valve opening angle and the vehicle speed, and the required electric power PM which is calculated by the auxiliary-drive-wheel drive-power calculating means 134 and which is required to drive the auxiliary drive wheels, namely, the target drive torque TG of the electric generator 48. The target-speed-ratio calculating means 172 is configured to calculate a target speed ratio γm of the automatic transmission 16 for obtaining the target drive torque TG of the electric generator 48 required to provide the target output thereof to generate the required amount of electric power, according to a predetermined stored map- and on the basis of the above-indicated target engine speed NEm and the target drive torque TG of the electric generator 48. The lock-up-clutch (coupling-device) releasing requirement determining means 174 is configured to determine whether the lock-up clutch 18 of the torque converter 14 is required to be released to cause slipping of the lock-up clutch 14, for the purpose of enabling the electric generator 48 to provide the target drive torque TG required to provide the target output to generate the required amount of electric power, namely, for the purpose of obtaining the target speed ratio γm of the automatic transmission 16.

The control commanding means 138 is operated when the lock-up-clutch releasing requirement determining means 174 determines that the lock-up clutch 18 is required to be released, after the target speed ratio γm is calculated by the target-speed-ratio calculating means 172, during starting of the vehicle, for example. The control commanding means 138 commands the shifting-up means 146 to shift up the automatic transmission 16 so as to obtain the target speed ratio γm, and commands the engaging-force reducing means 156 to reduce the engaging torque of the lock-up clutch 18 of the torque converter 14, for enabling the electric generator 48 to provide the target drive torque TG required to generate the required amount of electric power, so that the electronic throttle valve 20 is controlled to control the operating speed of the engine 12 so as to obtain the target value NEm.

Figure 18:
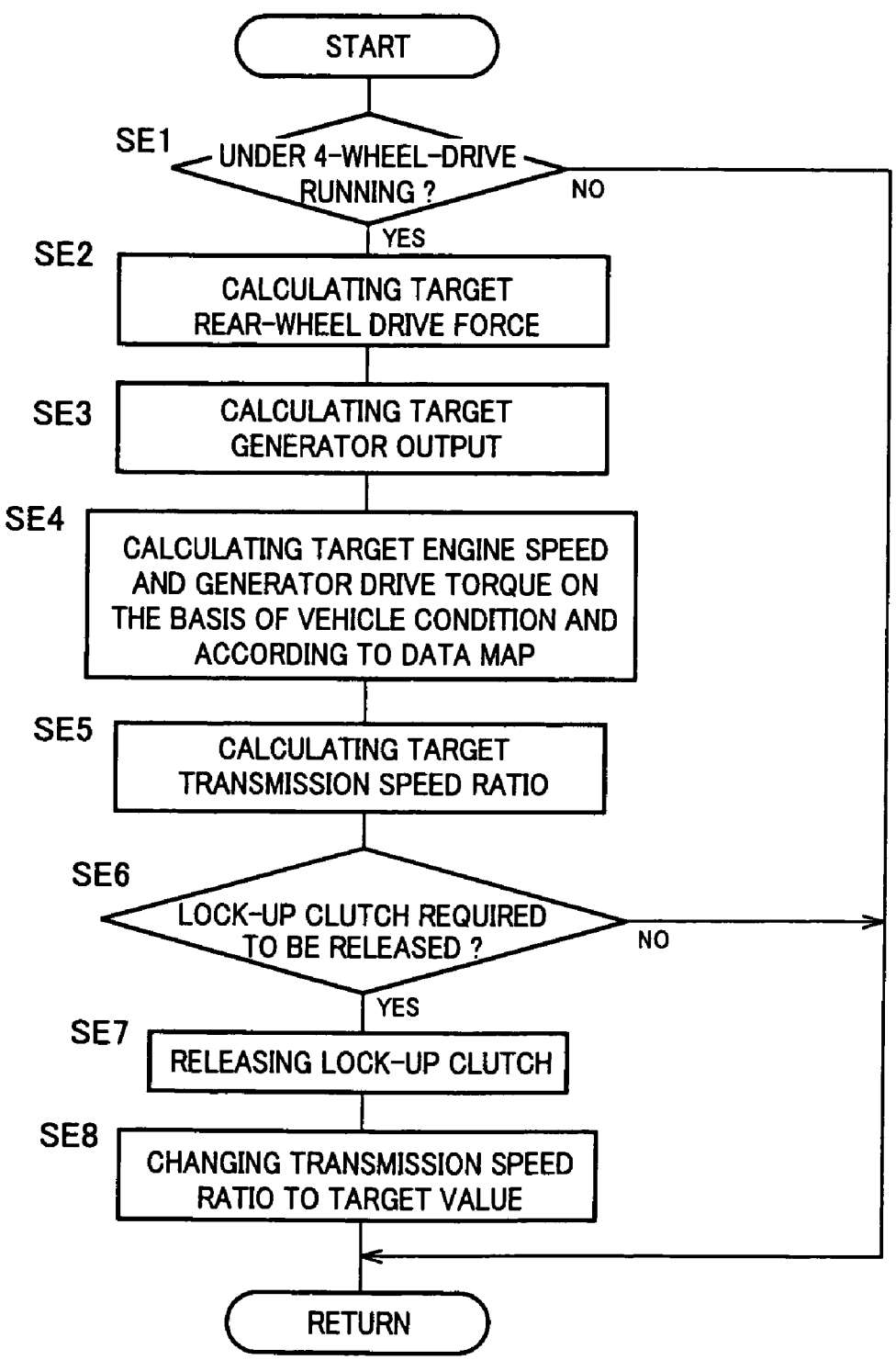
FIG. 18 is a flow chart illustrating a major control function of the electronic control device of the embodiment of FIG. 17.

Referring to the flow chart of FIG. 18, there is illustrated a major control function of the electronic control device 70 according to the present embodiment. The routine illustrated in the flow chart of FIG. 18 is executed while the vehicle is placed in the 4-wheel-drive mode, and is different from that of the flow chart of FIG. 16, in that SD4-SD7 are replaced by SE4-SE6. SE1-SE3 and SE7 are identical with SD1-SD3 and SD8, while SE7 and SE8 are identical with SD8 and SD9.

In SE4 of FIG. 18 corresponding to the target-engine-speed/target-generator-drive-torque calculating means 170, the target engine speed NEm required to provide the target output of the electric generator 48 to generate the required amount of electric power, and the target drive torque TG of the electric generator 48 required to provide the target output thereof, are calculated according to the predetermined stored map and on the basis of the vehicle condition as represented by the throttle valve opening angle and the vehicle speed, and the required electric power PM which is calculated by the auxiliary-drive-wheel drive-power calculating means 134 and which is required to drive the auxiliary drive wheels, namely, the target drive torque TG of the electric generator 48. Then, SE5 corresponding to the target-speed-ratio calculating means 172 is implemented to calculate the target speed ratio γm of the automatic transmission 16 for obtaining the target drive torque TG of the electric generator 48 required to provide the target output thereof to generate the required amount of electric power is calculated according to the predetermined stored map and on the basis of the above-indicated target engine speed NEm and the target drive torque TG of the electric generator 48. Subsequently, SE6 corresponding to the lock-up-clutch (coupling-device) releasing requirement determining means 174 is implemented to determine whether the lock-up clutch 18 of the torque converter 14 is required to be released to cause slipping of the lock-up clutch 18, for the purpose of enabling the electric generator 48 to provide the target drive torque TG required to provide the target output to generate the required amount of electric power, namely, for the purpose of obtaining the target speed ratio γm of the automatic transmission 16. If a negative determination is obtained in SE6, the present routine is terminated. If an affirmative determination is obtained in SE6, the control flow goes to SE7 to release the lock-up clutch 18 for reducing the engaging torque of the lock-up clutch 18, and then goes to SE8 to shift up the automatic transmission 16 for obtaining the target speed ratio γm, so that the electric generator 48 can provide the target drive torque TG required to provide the target output to generate the required amount of electric power.

The present embodiment is configured to reduce the engaging torque of the lock-up clutch 18 of the torque converter 14 and shift up the automatic transmission 16 to the target speed ratio γm that enables the electric generator 48 to provide the target drive torque TG required to provide the target output to generate the required amount of electric power. Thus, the present embodiment provides the same advantages as the preceding embodiments.

The features of the first through fourth embodiments described above are all or selectively applicable to the same vehicular drive system.

While the embodiments of this invention have been described above in detail by reference to the drawings, it is to be understood that the present invention may be otherwise embodied.

For example, the transmission in the form of the continuously variable transmission (CVT) 16 of the belt type provided in the illustrated embodiments may be replaced by a continuously variable transmission of trochoidal type, or a step-variable transmission. The speed ratio of the step-variable transmission can be reduced by shifting up the transmission.

While a battery for supplying the electric generator 68 with electric power for driving the rear wheels 32 is not provided in the illustrated embodiments, the present invention is applicable to a vehicular drive system provided with a battery for supplying the electric generator 68 for driving the rear wheels 32. In this case, the vehicle drive force control according to the invention is effected when the battery is not sufficiently charged.

While the fluid coupling device in the form of the torque converter is provided in the illustrated embodiments, the coupling device is not limited to the torque converter, and may be any other type of fluid coupling as long as the fluid coupling is configured to permit a difference between the rotating speeds of a drive-side member and a driven-side member.

The judging means 136 provided in the illustrated embodiment is configured to compare the required engine speed NEn calculated by the required-engine-speed calculating means 130 and the actual engine speed NE with each other. However, the judging means 136 may be modified to compare the amount of electric power PM of the electric motor 68 required to drive the auxiliary drive wheels 32 and the amount of electric power PG generated by the electric generator 48 operated at the actual engine speed NE. Namely, the judging means 136 may use any parameter other than the engine speed NE, which is equivalent to the engine speed NE. Where the judging means 136 is configured to compare the amount of electric power PM and the generated amount of electric power PG, rather than the engine speed values NE, the required-engine-speed calculating means 130 and the corresponding step SA4 are replaced by means and a step for calculating the amount of electric power PG required to be generated by the electric generator 48, according to a characteristic curve of the electric generator 48.

In the second embodiment described above, the additional shifting map is selected during starting of the vehicle while the snow-mode switch 83 is placed in the ON state. However, the additional shifting map may be selected while the vehicle is stationary. While the vehicle is stationary, the speed ratio of the automatic transmission 16 is reset to its maximum value. When the shifting map is changed from the ordinary shifting map to the additional shifting map, the maximum speed ratio is changed from the value γmax according to the ordinary shifting map, to the value γmax' lower than the value γmax. Where the vehicle drive force control according to the second embodiment is effected with the ordinary shifting map being selected during starting of the vehicle again after the vehicle is once stopped, the automatic transmission 16 must be shifted up during starting of the vehicle, for increasing the maximum speed ratio from the value γmax to the value γmax'. Where the additional shifting map is used while the vehicle is stationary, it is not necessary to shift up the automatic transmission during the vehicle starting.

In the modified arrangement described above, the automatic transmission 16 is shifted up while the vehicle is stationary, so that the electric generator 48 is enabled to generate the required amount of electric power PG upon starting of the vehicle, assuring higher stability of the vehicle starting during which the drive wheels would tend to slip.

The invention claimed is:

1. A vehicle drive force control apparatus for controlling a drive force of a vehicle which includes a main drive power source for driving main drive wheels through a coupling device and a transmission, an electric generator operated by a drive force generated by the main drive power source, and an electric motor which is driven by electric power generated by the electric generator, to generate a drive torque that can be transmitted to auxiliary drive wheels, said vehicle drive force control apparatus comprising:

engaging-force reducing means for reducing an engaging force of the coupling device during driving of the auxiliary drive wheels; and shifting-up means for shifting up the transmission during driving of the auxiliary drive wheels, the shifting-up means being configured to shift up the transmission when the engine-force reducing means reduces the engagement force of the coupling device.

2. The vehicle drive force control apparatus according to claim 1, wherein the coupling device is a torque converter provided with a lock-up mechanism, and said engaging-force reducing means releases the lock-up mechanism to reduce the engaging force of the torque converter during driving of the auxiliary drive wheels.

3. The vehicle drive force control apparatus according to claim 1, further comprising shifting-map changing means for changing a shift-up map for shifting up the transmission, during starting of the vehicle, such that the changed shift-up map causes a shift-up action of the transmission at a lower input speed thereof.

4. The vehicle drive force control apparatus according to claim 1, wherein reduction of the engaging force of the coupling device and a shift-up action of the transmission take place during starting of the vehicle.

5. The vehicle drive force control apparatus according to claim 1, wherein reduction of the engaging force of the coupling device and a shift-up action of the transmission are forcibly effected during starting of the vehicle.

6. The vehicle drive force control apparatus according to claim 1, wherein reduction of the engaging force of the coupling device and a shift-up action of the transmission are effected while the vehicle is stationary.

7. The vehicle drive force control apparatus according to claim 1, further comprising:
auxiliary-drive-wheel drive-force calculating means for calculating a required drive force of the auxiliary drive wheels;
judging means for determining whether an amount of electric power generated by the electric generator is sufficient to provide the required drive force of the auxiliary drive wheels calculated by said auxiliary-drive-wheel drive-force calculating means; and
control commanding means for commanding said engaging-force reducing means to reduce the engaging force of the coupling device and commanding said shifting-up means to shift up the transmission when the judging means determines that the amount of electric power generated by the electric generator is not sufficient to provide the required drive force of the auxiliary drive wheels.

8. The vehicle drive force control apparatus according to claim 1, further comprising:
control commanding means for commanding said engaging-force reducing means to reduce the engaging force of the coupling device and commanding said shifting-up means to shift up the transmission, in response to a manual operation by an operator of the vehicle.

9. The vehicle drive force control apparatus according to claim 1, further comprising:
auxiliary-drive-wheel drive-force calculating means for calculating a drive force required to drive said auxiliary drive wheels;
target generator-drive-torque calculating means for calculating a target drive torque of said electric generator required to provide a target output of the electric generator required to provide the drive force of the auxiliary drive wheels calculated by the auxiliary-drive-wheel drive-force calculating means;
speed-ratio-reduction feasibility determining means for determining, on the basis of a condition of the vehicle, whether reduction of a speed ratio of the transmission from a present value is feasible; and
control commanding means for commanding said engaging-force reducing means to reduce the engaging force of the coupling device and commanding said shifting-up means to shift up the transmission, to obtain the target drive torque of the electric generator, when the speed-ratio-reduction feasibility determining means has determined that the reduction of the speed ratio of the transmission from the present value is feasible.

10. The vehicle drive force control apparatus according to claim 1, further comprising:
auxiliary-drive-wheel drive-force calculating means for calculating a required drive force of said auxiliary drive wheels;
target-speed-ratio calculating means for calculating a target speed ratio of said transmission for obtaining a drive torque of said electric generator required to generate a required amount of electric power for obtaining the required drive force of said auxiliary drive wheels calculated by said auxiliary-drive-wheel drive-force calculating means;
coupling-device releasing requirement determining means for determining said coupling device is required to be released to cause slipping of the coupling device, for obtaining said target speed ratio; and
control commanding means configured to be operated, when said coupling-device releasing requirement determining means determines that the coupling device is required to be released to cause slipping of the coupling device, for commanding said engaging-force reducing means to reduce the engaging force of said coupling device and commanding said shifting-up means to shift up said transmission.

* * * * *